(12) United States Patent  
Carlson et al.

(10) Patent No.: US 8,990,439 B2  
(45) Date of Patent: Mar. 24, 2015

(54) TRANSPORT MODE DATA TRANSFER BETWEEN A CHANNEL SUBSYSTEM AND INPUT/OUTPUT DEVICES

(71) Applicant: International Business Machines Corporation, Armonk, NY (US)

(72) Inventors: Scott M. Carlson, Tucson, AZ (US); Daniel F. Casper, Poughkeepsie, NY (US); John R. Flanagan, Poughkeepsie, NY (US); Roger G. Hathorn, Tucson, AZ (US); Matthew J. Kalos, Tucson, AZ (US); Louis W. Ricci, Hyde Park, NY (US); Gustav E. Sittman, III, Webster Groves, MO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/904,203

(22) Filed: May 29, 2013

(65) Prior Publication Data

US 2014/0359168 A1   Dec. 4, 2014

(51) Int. Cl.
*G06F 5/00* (2006.01)
*G06F 3/00* (2006.01)

(52) U.S. Cl.
CPC ..................................... *G06F 3/002* (2013.01)
USPC ................................................. 710/5; 710/57

(58) Field of Classification Search
CPC .................................................. G06F 13/4282
USPC .................................................. 710/57, 5, 52
See application file for complete search history.

(56) References Cited

U.S. PATENT DOCUMENTS

| | | | |
|---|---|---|---|
| 3,693,161 | A | 9/1972 | Price et al. |
| 3,943,283 | A | 3/1976 | Caragliano et al. |
| 4,004,277 | A | 1/1977 | Gavril |
| 4,080,649 | A | 3/1978 | Calle et al. |

(Continued)

FOREIGN PATENT DOCUMENTS

| | | |
|---|---|---|
| DE | 3931514 | 3/1990 |
| GB | 1264096 | 2/1972 |

(Continued)

OTHER PUBLICATIONS

U.S. Appl. No. 12/031,201 Final Office Action dated Jun. 13, 2011.

(Continued)

*Primary Examiner* — Ernest Unelus
(74) *Attorney, Agent, or Firm* — Cantor Colburn LLP; Steven Chiu

(57) ABSTRACT

A computer program product is provided for performing an input/output (I/O) operation at a host computer system configured for communication with a control unit. The computer program product is configured to perform: sending a transport mode command message from a channel subsystem to the control unit, the command message including a command for data to be transferred to an I/O device controlled by the control unit; and sending a data transfer message to the control unit, the data transfer message having an amount of the data to be transferred, the amount of the data being less than or equal to a maximum amount of data, the maximum amount of data corresponding to a number of buffers associated with the control unit and a size of each of the number of buffers, the number and the size indicated by a value maintained in the host computer system.

20 Claims, 8 Drawing Sheets

(56) References Cited

U.S. PATENT DOCUMENTS

| | | |
|---|---|---|
| 4,207,609 A | 6/1980 | Luiz et al. |
| 4,374,415 A | 2/1983 | Cormier et al. |
| 4,380,046 A | 4/1983 | Frosch et al. |
| 4,455,605 A | 6/1984 | Cormier et al. |
| 4,497,022 A | 1/1985 | Cormier et al. |
| 4,564,903 A | 1/1986 | Guyette et al. |
| 4,760,518 A | 7/1988 | Potash et al. |
| 4,779,188 A | 10/1988 | Gum et al. |
| 4,837,677 A | 6/1989 | Burrus, Jr. et al. |
| 4,843,541 A | 6/1989 | Bean et al. |
| 4,866,609 A | 9/1989 | Calta et al. |
| 4,870,566 A | 9/1989 | Cooper et al. |
| 5,016,160 A | 5/1991 | Lambeth et al. |
| 5,031,091 A | 7/1991 | Wakatsuki et al. |
| 5,040,108 A | 8/1991 | Kanazawa |
| 5,170,472 A | 12/1992 | Cwiakala et al. |
| 5,185,736 A | 2/1993 | Tyrrell et al. |
| 5,237,325 A | 8/1993 | Klein et al. |
| 5,265,240 A | 11/1993 | Galbraith et al. |
| 5,297,262 A | 3/1994 | Cox et al. |
| 5,301,323 A | 4/1994 | Maeurer et al. |
| 5,317,739 A | 5/1994 | Elko et al. |
| 5,386,512 A | 1/1995 | Crisman et al. |
| 5,388,219 A | 2/1995 | Chan et al. |
| 5,410,727 A | 4/1995 | Jaffe et al. |
| 5,414,851 A | 5/1995 | Brice, Jr. et al. |
| 5,434,980 A | 7/1995 | Casper et al. |
| 5,440,729 A | 8/1995 | Kimura et al. |
| 5,452,455 A | 9/1995 | Brown et al. |
| 5,461,721 A | 10/1995 | Cormier et al. |
| 5,463,736 A | 10/1995 | Elko et al. |
| 5,465,359 A | 11/1995 | Allen et al. |
| 5,500,942 A | 3/1996 | Eickemeyer et al. |
| 5,517,670 A | 5/1996 | Allen et al. |
| 5,526,484 A | 6/1996 | Casper et al. |
| 5,528,755 A | 6/1996 | Beardsley et al. |
| 5,539,918 A | 7/1996 | Allen et al. |
| 5,546,533 A | 8/1996 | Koyama |
| 5,548,791 A | 8/1996 | Casper et al. |
| 5,561,809 A | 10/1996 | Elko et al. |
| 5,564,040 A | 10/1996 | Kubala |
| 5,568,648 A | 10/1996 | Coscarella et al. |
| 5,584,039 A | 12/1996 | Johnson et al. |
| 5,600,793 A | 2/1997 | Nord |
| 5,600,805 A | 2/1997 | Fredericks et al. |
| 5,608,898 A | 3/1997 | Turpin et al. |
| 5,613,163 A | 3/1997 | Marron et al. |
| 5,640,600 A | 6/1997 | Satoh et al. |
| 5,640,603 A | 6/1997 | Meritt et al. |
| 5,644,712 A | 7/1997 | Coscarella et al. |
| 5,671,441 A | 9/1997 | Glassen et al. |
| 5,680,580 A | 10/1997 | Beardsley et al. |
| 5,758,190 A | 5/1998 | Johnson et al. |
| 5,768,620 A | 6/1998 | Johnson et al. |
| 5,793,983 A | 8/1998 | Albert et al. |
| 5,812,877 A | 9/1998 | Young |
| 5,831,985 A | 11/1998 | Sandorfi |
| 5,845,146 A | 12/1998 | Onodera |
| 5,860,022 A | 1/1999 | Kondou et al. |
| 5,894,583 A | 4/1999 | Johnson et al. |
| 5,901,327 A | 5/1999 | Ofek |
| 5,907,684 A | 5/1999 | Halma et al. |
| 5,918,028 A | 6/1999 | Silverthorn et al. |
| 5,996,026 A | 11/1999 | Onodera et al. |
| 6,125,399 A | 9/2000 | Hamilton |
| 6,125,411 A | 9/2000 | Sato |
| 6,195,330 B1 | 2/2001 | Sawey et al. |
| 6,202,095 B1 | 3/2001 | Beardsley et al. |
| 6,230,218 B1 | 5/2001 | Casper et al. |
| 6,249,787 B1 | 6/2001 | Schleimer et al. |
| 6,263,380 B1 | 7/2001 | Tsuboi et al. |
| 6,338,105 B1 | 1/2002 | Niizuma et al. |
| 6,343,335 B1 | 1/2002 | Dahman et al. |
| 6,347,334 B1 | 2/2002 | Fredericks et al. |
| 6,351,779 B1 | 2/2002 | Berg et al. |
| 6,353,612 B1 | 3/2002 | Zhu et al. |
| 6,460,087 B1 | 10/2002 | Saito et al. |
| 6,484,217 B1 | 11/2002 | Fuente et al. |
| 6,546,435 B1 | 4/2003 | Yoshimura et al. |
| 6,584,511 B1 | 6/2003 | Marsh, III et al. |
| 6,609,161 B1 | 8/2003 | Young |
| 6,609,165 B1 | 8/2003 | Frazier |
| 6,647,016 B1 | 11/2003 | Isoda et al. |
| 6,651,125 B2 | 11/2003 | Maergner et al. |
| 6,654,954 B1 | 11/2003 | Hicks |
| 6,658,603 B1 | 12/2003 | Ward |
| 6,687,766 B1 | 2/2004 | Casper et al. |
| 6,693,880 B2 | 2/2004 | Gregg et al. |
| 6,694,390 B1 | 2/2004 | Bogin et al. |
| 6,751,680 B2 | 6/2004 | Langerman et al. |
| 6,751,683 B1 | 6/2004 | Johnson et al. |
| 6,769,009 B1 | 7/2004 | Reisman |
| 6,772,207 B1 | 8/2004 | Dorn et al. |
| 6,826,661 B2 | 11/2004 | Umbehocker et al. |
| 6,839,773 B2 | 1/2005 | Vishlitzky et al. |
| 6,862,322 B1 | 3/2005 | Ewen et al. |
| 6,877,043 B2 | 4/2005 | Mallory et al. |
| 6,882,634 B2 | 4/2005 | Bagchi et al. |
| 6,898,202 B2 | 5/2005 | Gallagher et al. |
| 6,910,149 B2 | 6/2005 | Perloff et al. |
| 6,915,378 B2 | 7/2005 | Roberti |
| 6,950,888 B1 | 9/2005 | Rooney et al. |
| 6,963,940 B1 | 11/2005 | Glassen et al. |
| 7,000,036 B2 | 2/2006 | Carlson et al. |
| 7,003,700 B2 | 2/2006 | Elko et al. |
| 7,020,810 B2 | 3/2006 | Holman |
| 7,035,540 B2 | 4/2006 | Finan et al. |
| 7,046,665 B1 | 5/2006 | Walrand et al. |
| 7,058,735 B2 | 6/2006 | Spencer |
| 7,085,860 B2 | 8/2006 | Dugan et al. |
| 7,100,096 B2 | 8/2006 | Webb, Jr. et al. |
| 7,111,130 B2 | 9/2006 | Blake et al. |
| 7,120,728 B2 | 10/2006 | Krakirian et al. |
| 7,124,207 B1 | 10/2006 | Lee et al. |
| 7,133,988 B2 | 11/2006 | Fujibayashi |
| 7,142,520 B1 | 11/2006 | Haverinen et al. |
| 7,149,823 B2 | 12/2006 | Miller et al. |
| 7,155,569 B2 | 12/2006 | Johnson et al. |
| 7,164,425 B2 | 1/2007 | Kwak et al. |
| 7,174,274 B2 | 2/2007 | Carlson et al. |
| 7,202,801 B2 | 4/2007 | Chou |
| 7,266,296 B2 | 9/2007 | Ovadia et al. |
| 7,277,387 B2 | 10/2007 | Sanders et al. |
| 7,292,597 B2 | 11/2007 | Mills et al. |
| 7,315,911 B2 | 1/2008 | Davies et al. |
| 7,373,435 B2 | 5/2008 | Carlson et al. |
| 7,382,733 B2 | 6/2008 | Banerjee et al. |
| 7,395,284 B2 | 7/2008 | Sato et al. |
| 7,398,335 B2 | 7/2008 | Sonksen et al. |
| 7,484,021 B2 | 1/2009 | Rastogi et al. |
| 7,500,023 B2 | 3/2009 | Casper et al. |
| 7,500,030 B2 | 3/2009 | Hathorn et al. |
| 7,502,873 B2 | 3/2009 | Casper et al. |
| 7,512,133 B2 | 3/2009 | Dugan et al. |
| 7,516,248 B2 | 4/2009 | Carlson et al. |
| 7,539,777 B1 | 5/2009 | Aitken |
| 7,543,087 B2 | 6/2009 | Philbrick et al. |
| 7,555,554 B2 | 6/2009 | Manders et al. |
| 7,558,827 B2 | 7/2009 | Kawashima et al. |
| 7,564,791 B2 | 7/2009 | Jayakrishnan et al. |
| 7,577,772 B2 | 8/2009 | Sonksen et al. |
| 7,577,773 B1 | 8/2009 | Gandhi et al. |
| 7,594,057 B1 | 9/2009 | Gandhi et al. |
| 7,599,360 B2 | 10/2009 | Edsall et al. |
| 7,600,053 B2 | 10/2009 | Carlson et al. |
| 7,711,871 B1 | 5/2010 | Haechten et al. |
| 7,743,197 B2 | 6/2010 | Chavan et al. |
| 7,765,336 B2 | 7/2010 | Butler et al. |
| 7,826,349 B2 | 11/2010 | Kaur et al. |
| 7,840,717 B2 | 11/2010 | Flanagan et al. |
| 7,840,718 B2 | 11/2010 | Ricci et al. |
| 7,840,719 B2 | 11/2010 | Casper et al. |
| 7,856,511 B2 | 12/2010 | Ricci et al. |
| 8,495,253 B2 | 7/2013 | Flanagan et al. |

(56) References Cited

U.S. PATENT DOCUMENTS

| | | |
|---|---|---|
| 2001/0030943 A1 | 10/2001 | Gregg et al. |
| 2002/0032810 A1 | 3/2002 | Wagner |
| 2002/0062407 A1 | 5/2002 | Tateyama et al. |
| 2002/0099967 A1 | 7/2002 | Kawaguchi |
| 2002/0152338 A1 | 10/2002 | Elliott et al. |
| 2002/0178404 A1 | 11/2002 | Austen et al. |
| 2003/0056000 A1 | 3/2003 | Mullendore et al. |
| 2003/0084213 A1 | 5/2003 | Brice, Jr. et al. |
| 2003/0103504 A1 | 6/2003 | Dugan et al. |
| 2003/0158998 A1 | 8/2003 | Smith |
| 2003/0187627 A1 | 10/2003 | Hild et al. |
| 2003/0188053 A1 | 10/2003 | Tsai |
| 2003/0208581 A1 | 11/2003 | Behren et al. |
| 2004/0030822 A1 | 2/2004 | Rajan et al. |
| 2004/0054776 A1 | 3/2004 | Klotz et al. |
| 2004/0113772 A1 | 6/2004 | Hong Chou |
| 2004/0125960 A1 | 7/2004 | Fosgate et al. |
| 2004/0136241 A1 | 7/2004 | Rapp et al. |
| 2004/0151160 A1 | 8/2004 | Sanders et al. |
| 2004/0193968 A1 | 9/2004 | Dugan et al. |
| 2004/0210719 A1 | 10/2004 | Bushey et al. |
| 2004/0230706 A1 | 11/2004 | Carlson et al. |
| 2004/0260851 A1 | 12/2004 | Tu |
| 2005/0018673 A1 | 1/2005 | Dropps et al. |
| 2005/0102456 A1 | 5/2005 | Kang |
| 2005/0105456 A1 | 5/2005 | Cookson et al. |
| 2005/0108251 A1 | 5/2005 | Hunt |
| 2005/0175341 A1 | 8/2005 | Ovadia |
| 2005/0193029 A1 | 9/2005 | Rom et al. |
| 2005/0204069 A1 | 9/2005 | Carlson et al. |
| 2005/0216617 A1 | 9/2005 | Carlson et al. |
| 2005/0223291 A1 | 10/2005 | Zimmer et al. |
| 2005/0229033 A1 | 10/2005 | Tanaka et al. |
| 2005/0257118 A1 | 11/2005 | Shien |
| 2006/0036769 A1 | 2/2006 | Frey et al. |
| 2006/0050726 A1 | 3/2006 | Ahmed et al. |
| 2006/0075154 A1 | 4/2006 | Carlson et al. |
| 2006/0085595 A1 | 4/2006 | Slater |
| 2006/0159112 A1 | 7/2006 | Sundaram et al. |
| 2006/0224795 A1 | 10/2006 | Muto et al. |
| 2007/0005838 A1 | 1/2007 | Chang et al. |
| 2007/0016554 A1 | 1/2007 | Dapp et al. |
| 2007/0061463 A1 | 3/2007 | Hiramatsu et al. |
| 2007/0072543 A1 | 3/2007 | Paila et al. |
| 2007/0079022 A1 | 4/2007 | Carlson et al. |
| 2007/0079051 A1 | 4/2007 | Tanaka et al. |
| 2007/0091497 A1 | 4/2007 | Mizuno et al. |
| 2007/0162631 A1 | 7/2007 | Balakrishnan et al. |
| 2007/0174544 A1 | 7/2007 | Yasuda et al. |
| 2007/0239944 A1 | 10/2007 | Rupanagunta et al. |
| 2007/0294697 A1 | 12/2007 | Theimer et al. |
| 2008/0040519 A1 | 2/2008 | Starr et al. |
| 2008/0043563 A1 | 2/2008 | Brice et al. |
| 2008/0059638 A1 | 3/2008 | Hathorn et al. |
| 2008/0103754 A1 | 5/2008 | Carlson et al. |
| 2008/0103755 A1 | 5/2008 | Carlson et al. |
| 2008/0109580 A1 | 5/2008 | Carlson et al. |
| 2008/0147889 A1 | 6/2008 | Casper et al. |
| 2008/0147890 A1 | 6/2008 | Casper et al. |
| 2008/0183877 A1 | 7/2008 | Carlson et al. |
| 2008/0235553 A1 | 9/2008 | Chintada |
| 2008/0256264 A1 | 10/2008 | Muto et al. |
| 2008/0273518 A1 | 11/2008 | Pratt |
| 2008/0307122 A1 | 12/2008 | Butler et al. |
| 2009/0049241 A1 | 2/2009 | Ohno et al. |
| 2009/0055585 A1 | 2/2009 | Fernandes et al. |
| 2009/0144586 A1 | 6/2009 | Casper et al. |
| 2009/0172203 A1 | 7/2009 | Casper et al. |
| 2009/0210557 A1* | 8/2009 | Gainey et al. .................. 710/2 |
| 2009/0210559 A1 | 8/2009 | Flanagan et al. |
| 2009/0210560 A1 | 8/2009 | Yudenfriend et al. |
| 2009/0210561 A1 | 8/2009 | Ricci et al. |
| 2009/0210562 A1 | 8/2009 | Huang et al. |
| 2009/0210563 A1 | 8/2009 | Flanagan et al. |
| 2009/0210564 A1 | 8/2009 | Ricci et al. |
| 2009/0210570 A1 | 8/2009 | Bendyk et al. |
| 2009/0210571 A1 | 8/2009 | Casper et al. |
| 2009/0210572 A1 | 8/2009 | Yudenfriend et al. |
| 2009/0210573 A1 | 8/2009 | Yudenfriend et al. |
| 2009/0210576 A1 | 8/2009 | Casper et al. |
| 2009/0210579 A1 | 8/2009 | Bendyk et al. |
| 2009/0210580 A1 | 8/2009 | Bendyk et al. |
| 2009/0210581 A1 | 8/2009 | Flanagan et al. |
| 2009/0210582 A1 | 8/2009 | Bendyk et al. |
| 2009/0210583 A1 | 8/2009 | Bendyk et al. |
| 2009/0210584 A1 | 8/2009 | Carlson et al. |
| 2009/0210585 A1 | 8/2009 | Ricci et al. |
| 2009/0210768 A1 | 8/2009 | Carlson et al. |
| 2009/0210769 A1 | 8/2009 | Casper et al. |
| 2009/0210884 A1 | 8/2009 | Ricci et al. |
| 2009/0307388 A1 | 12/2009 | Tchapda |
| 2010/0014526 A1 | 1/2010 | Chavan et al. |
| 2010/0064072 A1 | 3/2010 | Tang et al. |
| 2012/0110222 A1* | 5/2012 | Dang et al. .................. 710/52 |

FOREIGN PATENT DOCUMENTS

| | | |
|---|---|---|
| GB | 2291990 | 2/1996 |
| JP | 63236152 | 10/1988 |
| JP | 2010-140127 A | 6/2010 |
| WO | 2006102664 A2 | 9/2006 |

OTHER PUBLICATIONS

U.S. Appl. No. 12/946,514, Non-Final Office Action Mailed Jun. 23, 2011.
U.S. Appl. No. 12/183,323, Notice of Allowance Mailed Jun. 23, 2011.
Aboda, B.-et al.; Network Working Group; "Securing Block Storage Protocols Over IP"; ACM Digital Library; RFC3723; Apr. 2004, pp. 1-66.
Azimi, R.-et al.; "miNI: Reducing Network Interface Memory Requirements with Dynamic Handle Lookup"; ACM Digital Library; pp. 261-272; Jun. 2003.
Emulex Corporation; "Install the LP850 Host Adapter"; Google/Emulex Corporation, LightPulse LP850 Fibre Channel PCI Host Adapter Manuals; pp. 1-10, 1999.
Foong, A.-et al.; "Towards SSD-Ready Enterprise Platforms"; Google/Intel Corporation; 2008-2009, pp. 1-7.
Hewlett-Packard Company; "HP A4800A PCI FWD SCSI Host Bus Adapter—Service & User Guide", Edition 6; Google/H-P; 2001, pp. 1-64.
Hewlett-Packard Company; "HP A5149 PCI Ultra2 SCSI Host Bus Adapter—Service and User Guide", Edition 2; Google/H-P; 2001, pp. 1-66.
U.S. Appl. No. 12/030,951, Notice of Allowance Mailed Apr. 4, 2011.
U.S. Appl. No. 12/364,615, Notice of Allowance Mailed Mar. 10, 2011.
Jiang, J.-et al.; "The Role of FCoE in I/O Consolidation"; ACM Digital Library/International Conf on Advanced Infocomm Technology '08; Jul. 2008, pp. 1-6.
Josephson, WK.-et al.; "DFS: A File System for Virtualized Flash Storage"; ACM Digital Library; vol. 6, No. 3, Article 14, Sep. 2010, pp. 1-15.
LSI Corporation; "PCI Express to 6Gb/s SAS Host Bus Adapters"; Google; Chapter 1, Introduction/Overview; LSI User Guide; Oct. 2009, pp. 1-28.
LSI; "ScsiPortGetDeivceBase"; Google/LSI; Apr. 2003, pp. 1-3.
Magoutis, K.; "The Optimistic Direct Access File System: Design and Network Interface Support"; Division of Engineering & Applied Science, Harvard Univ.; Feb. 2002, pp. 1-12.
Miller, DJ.-et al.; "Motivating Future Interconnects: A Differential Measurement Analysis of PCI Latency"; ACM Digital Library; pp. 94-105; Oct. 2009.
Network Storage Systems; Google; Oct. 2007, pp. 1-7.
Sun, Oracle; "Sun Storage 6 Gb SAS PCIe HBA, External—Installation Guide for HBA Models"; Google; Revision A; Nov. 2010, 80 pages.
Petersen, MK.-et al.; "DIF/DIX Aware Linux SCSI HBA Interface"; Google; Oracle Linux Engineering; Jul. 2008, pp. 1-258.

(56) References Cited

OTHER PUBLICATIONS

Satran, J.-et al.; Network Working Group; "Internet Small Computer Systems Interface (iSCSI)"; ACM Digital Library; RFC3720; Apr. 2004., pp. 1-258.
Vaghani, SB.; "Virtual Machine File System"; VMWare Inc./ACM Digital Library; pp. 57-69; 2008-2009.
U.S. Appl. No. 12/030,954 Non-Final Office Action dated Jan. 21, 2010.
U.S. Appl. No. 12/031,042, Final Office Action Mailed Oct. 25, 2010.
U.S. Appl. No. 12/031,042, Non-Final Office Action Mailed Apr. 5, 2010.
U.S. Appl. No. 12/031,021, Notice of Allowance Mailed Apr. 30, 2010.
U.S. Appl. No. 12/181,662, Notice of Allowance Mailed Aug. 4, 2010.
U.S. Appl. No. 12/364,615, Non Final Office Action Mailed Oct. 7, 2010.
U.S. Appl. No. 12/183,305, Non-Final Office Action Mailed May 11, 2010.
U.S. Appl. No. 12/183,305, Notice of Allowance Mailed Nov. 1, 2010.
U.S. Appl. No. 12/183,315, Notice of Allowance Mailed Dec. 13, 2010.
U.S. Appl. No. 12/183,315 Notice of Allowance dated Sep. 20, 2010.
U.S. Appl. No. 12/183,323, Non-Final Office Action Mailed Jan. 3, 2011.
IBM, "Method and Apparatus to Monitor PAV Utilization", Feb. 2005, pp. 1-3. http://priorartdatabase.com/IPCOM/000082878.
IBM® z/Architecture Principles of Operation, Publication No. SA22-7832-05, 6th Edition, Apr. 2007. 1,215 pages separated into 4 electronic attachments_Part 1.
IBM® z/Architecture Principles of Operation, Publication No. SA22-7832-05, 6th Edition, Apr. 2007. 1,215 pages separated into 4 electronic attachments. Part 2.
IBM® z/Architecture Principles of Operation, Publication No. SA22-7832-05, 6th Edition, Apr. 2007. 1,215 pages separated into 4 electronic attachments. Part 3.
IBM® z/Architecture Principles of Operation, Publication No. SA22-7832-05, 6th Edition, Apr. 2007. 1,215 pages separated into 4 electronic attachments. Part 4.
Z/Series Input/Output Configuration Program users Guide for IYP IOCP, SB10-7029-03c. International Business Machines Corporation, Jun. 2003, pp. 1-372.
Iren, et al.; "The Transport Layer: Tutorial and Survey"; ACM Computing Surveys; vol. 31, No. 4; Dec. 1999; pp. 360-405.
Ishikawa, Hikaru, et al. "Bi-Directional OFDM Transmission using Adaptive Modulation that spreads Data Symbols". Power Line Communications and its Applications, 2006, IEEE International Symposium on, Vol., No., pp. 202-207.
International Search Report and Written Opinion for PCT/EP2009/051447 dated Jul. 1, 2009.
International Search Report and Written Opinion for PCT/EP2009/051483 dated Jul. 27, 2009.
Written Opinion and International Search Report for PCT/EP2009/051445 dated Jun. 25, 2009.
Written Opinion and International Search Report for PCT/EP2009/051446 dated Jun. 25, 2009.
Written Opinion and International Search Report for PCT/EP2009/051461 dated Sep. 22, 2009.
Written Opinion and International Search Report for PCT/EP2009/051462 dated Jul. 1, 2009.
Written Opinion and International Search Report for PCT/EP2009/051450 dated Jul. 7, 2009.
Written Opinion and International Search Report for PCT/EP2009/051459 dated Jun. 23, 2009.
Written Opinion and International Search Report for PCT/EP2009/051463 dated Jul. 22, 2009.
Moore et al., Reconfiguration of Storage Elements to Improve Performance, IBM, Dec. 1983, pp. 1-3. http://priorartdatabas.com/IPCOM/000047719.
Nordstrom.; "Sequence Reception Method for a Fibre Channel Protocol Chip"; IBM Technical Disclosure Bulletin; vol. 38, No. 12; Dec. 1995; pp. 267-269.
Peterson; "Information Techonology, Fibre Channel Protocol for SCSI, Fourth Version (FCP-3)", Draft Proposed American National Standard, Jun. 2004; pp. 1-142.
Patent No. 7,000,036, U.S. Appl. No. 10/435,906, Notice of Allowance dated Nov. 3, 2005.
Patent No. 7,000,036, U.S. Appl. No. 10/435,906, Non-Final Office Action dated Jul. 15, 2005.
Patent No. 7,174,274, U.S. Appl. No. 11/126,727, Non-Final Office Action dated Jun. 8, 2006.
Patent No. 7,174,274, U.S. Appl. No. 11/126,727, Non-Final Office Action dated Jun. 21, 2006.
U.S. Appl. No. 11/126,728 Notice of Allowance Jun. 13, 2007.
Patent No. 7,174,274, U.S. Appl. No. 11/126,727 Notice of Allowance Sep. 27, 2006.
U.S. Appl. No. 11/126,728 Non-Final Office Action Apr. 16, 2007.
Patent No. 7,373,435, U.S. Appl. No. 11/282,393, Non-Final Office Action Jun. 11, 2007.
Patent No. 7,373,435, U.S. Appl. No. 11/282,393, Non-Final Office Action Sep. 13, 2007.
Patent No. 7,373,435, U.S. Appl. No. 11/282,393, Notice of Allowance dated Jan. 31, 2008.
U.S. Appl. No. 11/469,573 Non-Final Office Action dated Apr. 11, 2008.
Patent No. 7,600,053, U.S. Appl. No. 11/965,833, Non-Final Office Action dated Mar. 17, 2009.
Patent No. 7,600,053, U.S. Appl. No. 11/965,833, Notice of Allowance dated May 26, 2009.
U.S. Appl. No. 11/965,866 Non-Final Office Action dated Jun. 3, 2010.
Patent No. 7,516,248, U.S. Appl. No. 11/965,916, Notice of Allowance Nov. 20, 2008.
U.S. Appl. No. 11/548,060 Non-Final Office Action dated Apr. 15, 2008.
U.S. Appl. No. 11/548,093 Non-Final Office Action dated Apr. 17, 2008.
U.S. Appl. No. 12/031,182 Non-Final Office Action dated Jan. 22, 2010.
U.S. Appl. No. 12/183,315, filed Jul. 31, 2008.
U.S. Appl. No. 12/030,967 Restriction Requirement Mailed Dec. 29, 2009.
U.S. Appl. No. 12/183,305, filed Jul. 31, 2008.
ANSI INCITS 433-2007, Information Technology Fibre Channel Link Services (FC-LS), Jul. 2007, pp. 1-211.
Behrs, Jr, "Adaptive Prediction Minimizes Data Overrun and Underrun", IBM, Nov. 1994, pp. 1-3. http://priorartdatabase.com/IPCOM/000114189.
Cakmakci, Melih, et al. "Bi-Directional Communication amoung "Smart" Compoents in a Networked Control System", University of Michigan: Department of Mechanical Engineering, 2005 American control conference, Jun. 8-10, 2005, Portland, OR, pp. 627-632.
Meritt, A.S. and J.H. Sorg, "Correction of Channel Measurement Data Caused by Control Unit Queuing," IBM Technical Disclosure Bulletin, vol. 33, No. 11, Apr. 1991, pp. 100-103.
Dauby, et al. "Contention Resolution Between Two Processors"; IBM Technical Disclosure Bulletin; vol. 26; No. 10A; Mar. 1984; 3 pages.
DeVeer, J.A.; "Control Frame Multiplexing on Serial I/O Channels"; IBM Technical Disclosure Bulletin; vol. 32; No. 10A; Mar. 1990; pp. 39-40.
Fibre Channel Single Byte Command Code Sets-2 Mapping Protocol (FC-SB-3), T11/Project 1357-D/Rev 1.6, INCITS Mar. 2003, pp. 1-206.
"Information Technology-Fibre Channel Protocol for SCSI, Third Version (FCP-3)," T10 Project 1560-D, Revision 4g, Sep. 13, 2005, pp. 1-140.
U.S. Appl. No. 12/031,038 Non-Final Office Action dated Nov. 16, 2009.
U.S. Appl. No. 12/030,912 Non-Final Office Action dated Mar. 18, 2010.

(56) References Cited

OTHER PUBLICATIONS

U.S. Appl. No. 12/030,920 Non-Final Office Action dated Feb. 23, 2010.
U.S. Appl. No. 12/030,975 Non-Final Office Action dated Oct. 22, 2009.
U.S. Appl. No. 12/030,932 Non-Final Office Action dated Dec. 16, 2009.
U.S. Appl. No. 12/031,023 Non-Final Office Action dated Oct. 29, 2009.
U.S. Appl. No. 12/030,951 Non-Final Office Action dated May 20, 2010.
U.S. Appl. No. 12/030,951 Non-Final Office Action dated Nov. 23, 2009.
U.S. Appl. No. 12/030,961 Non-Final Office Action dated Dec. 17, 2009.
U.S. Appl. No. 12/030,939 Non-Final Office Action dated Nov. 16, 2009.
U.S. Appl. No. 12/030,989 Non-Final Office Action dated Oct. 22, 2009.
U.S. Appl. No. 12/030,993 Non-Final Office Action dated Oct. 28, 2009.
U.S. Appl. No. 12/031,021 Non-Final Office Action dated Jan. 8, 2010.
U.S. Appl. No. 12/181,662—Non-Final Office Action dated Jun. 18, 2009.
U.S. Appl. No. 12/181,662—Final Office Action dated Jan. 4, 2010.
U.S. Appl. No. 12/031,038, Notice of Allowance Mailed Oct. 6, 2010.
U.S. Appl. No. 12/031,038, Non-Final Office Action Mailed Apr. 15, 2010.
U.S. Appl. No. 12/030,912; Final Office Action; mailed Oct. 6, 2010.
U.S. Appl. No. 12/031,182 Final Office Action Mailed Jul. 22, 2010.
U.S. Appl. No. 12/031,182, Non Final Office Action Mailed Dec. 23, 2010.
U.S. Appl. No. 12/030,920, Notice of Allowance Mailed Dec. 28, 2010.
U.S. Appl. No. 12/030,920 Notice of Allowance Mailed Aug. 23, 2010.
U.S. Appl. No. 12/030,954, Notice of Allowance mailed Dec. 28, 2010.
U.S. Appl. No. 12/030,975; Final Office Action Mailed May 13, 2010.
U.S. Appl. No. 12/030,975, Notice of Allowance Mailed Oct. 19, 2010.
U.S. Appl. No. 12/030,932, Final Office Action Mailed Jul. 23, 2010.
U.S. Appl. No. 12/030,932, Non-Final Office Action Mailed Dec. 16, 2010.
U.S Appl. No. 12/031,023, Final Office Action Mailed Nov. 18, 2010.
U.S. Appl. No. 12/030,951, Final Office Action Mailed Oct. 26, 2010.
U.S. Appl. No. 12/030,961 Notice of Allowance Mailed Nov. 5, 2010.
U.S. Appl. No. 12/030,967 Notice of Allowance Mailed Oct. 7, 2010.
U.S. Appl. No. 12/030,967, Notice of Allowance mailed Apr. 23, 2010.
U.S. Appl. No. 12/031,201, Final Office Action Mailed Aug. 3, 2010.
U.S. Appl. No. 12/031,201, Non-Final Office Action Mailed Dec. 27, 2010.
U.S. Appl. No. 12/303,985, Non Final Office Action Mailed May 5, 2010.
U.S. Appl. No. 12/030,985, Notice of Allowance mailed Nov. 24, 2010.
U.S. Appl. No. 12/030,993, Final Office Action Mailed Dec. 10, 2010.
URL, http://en.wikipedia.org/wiki/FICON, FICON, Wikipedia, USA, Wikimedia Foundation, Inc., Aug. 9, 2011, 3 pages.
U.S. Appl. No. 13/024,468, Non Final Office Action Mailed Jan. 26, 2012.
U.S. Appl. No. 12/030,912, Final Office Action Mailed Feb. 27, 2012.
U.S. Appl. No. 12/031,182 Non-Final Office Action dated Mar. 16, 2012.
U.S. Appl. No. 12/030,981, Notice of Allowance mailed Jan. 27, 2012.
U.S. Appl. No. 12/031,023, Non-Final Office Action Mailed Feb. 1, 2012.
U.S. Appl. No. 13/351,073, Non Final Office Action Mailed Mar. 30, 2012.
U.S. Appl. No. 12/030,993 Notice of Allowance Mailed Dec. 22, 2011.
U.S. Appl. No. 12/031,042, Notice of Allowance Mailed Feb. 29, 2012.
U.S. Appl. No. 13/833,878, Notice of Allowance Mailed Dec. 6, 2013, 76 pages.
U.S. Appl. No. 12/031,023, Notice of Allowance Mailed Jul. 5, 2012, 32 pages.
U.S. Appl. No. 13/351,073 Notice of Allowance Mailed Apr. 15, 2013, 13 pages.
U.S. Appl. No. 12/030,912 Non Final Office Action Mailed Aug. 18, 2011.
U.S. Appl. No. 12/031,182 Final Office Action dated Oct. 20, 2011.
U.S. Appl. No. 12/030,925, Notice of Allowance Mailed Sep. 7, 2011.
U.S. Appl. No. 12/030,932, Notice of Allowance mailed Nov. 1, 2011.
U.S. Appl. No. 12/030,981 Non Final Office Action Mailed Aug. 2, 2011.
U.S. Appl. No. 12/030,938, Notice of Allowance Mailed Aug. 8, 2011.
U.S. Appl. No. 12/030,989, Notice of Allowance Mailed Aug. 5, 2011.
U.S. Appl. No. 12/031,042, Non-Final Office Action Mailed Sep. 30, 2011.
U.S. Appl. No. 12/031,201 Non-Final Office Action dated Jan. 25, 2010.
U.S. Appl. No. 12/030,989 Final Office Action dated May 24, 2010.
U.S. Appl. No. 12/183,315, Notice of Allowance Mailed on Jun. 15, 2010.
International Search Report; International Application No. PCT/EP2009/059184; International Filing Date: Jul. 16, 2009; Date of mailing: Jan. 14, 2010; 9 pages.
"Protocol for Insochronous Traffic Over Fiber Channel Switching"; IBM Technical Disclosure Bulletin; vol. 37, No. 06B; Jun. 1994. pp. 377-380.
Golasky, Richard; "Link-Level Error Recovery With Tape Backup"; Dell Power Solutions; Aug. 2005; pp. 88-91.
Sachs, M.W.; "I/O Marker Changing"; IBM Technical Disclosure Bulletin; vol. 37, No. 02A; Feb. 1994; pp. 75-76.
SCSI Primary Commands—4 (SPC-4); Project T10/1731-D. Rev 11. Incits Apr. 14, 2010, 785 pages (Part 1, pp. 1-390, Part 2, pp. 391-785).
Simmons et al.; "A Performance Comparison of Three Supercomputers: Fujitsu VP-2600, NEC SX-3, and CRAY Y-MP"; ACM, Conference on High Performance Networking and Computing, Proceedings of the 1991 ACM/IEEE conference on Supercomputing, Albuquerque, New Mexico; Jul. 1991; pp. 150-157.
Snively, et al.; "Fibre Channel, Framing and Signaling"; (FC-FS) Rev. 1.70; NCITS Working Draft Proposed American National Standard for Information Technology; Feb. 2002; pp. 1-575.
Snively et al.; Fibre Channel Single Byte Command Code Sets-3 Mapping Protocol (FC-SB-3); T11/Project 1357-D/Rev. 1.6, INCITS; Mar. 2003; pp. 1-206.
Srikrishnan et al.; "Sharing FCP Adapters Through Virtualization"; IBM J. Res. & Dev., vol. 51, No. 1/2; Jan./Mar. 2007; pp. 103-118.
Stone, et al.; "When the CRC and TCP Checksum Disagree"; SIGCOMM '00, Stockholm, Sweden; Jul. 2000; 10 pages.
Laudon et al. •System Overview of the SGI Origin 200/2000 Product Line, 1997, iEEE Publication pp. 150-156.
Tachikawa, T., et al. "ARQ protocols for bi-directional data transmission," Information Networking, 1998 (ICOIN-12) Proceedings., Twelfth International Conference on., vol., No., pp. 468-473, Jan. 21-23, 1998.
U.S. Appl. No. 12/183,323, filed Jul. 31, 2008.
U.S. Appl. No. 12/030,939 Notice of Alllowance mailed Jun. 29, 2010.
U.S. Appl. No. 12/030,954 Non Final Office Action mailed Jul. 12, 2010.

(56) References Cited

OTHER PUBLICATIONS

U.S. Appl. No. 12/030,961 Final Office Action mailed Jul. 12, 2010.
U.S. Appl. No. 12/030,993 Non Final Office Action mailed Jun. 28, 2010.
U.S. Appl. No. 12/031,021 Notice of Allowance mailed Jul. 8, 2010.
U.S. Appl. No. 12/031,023 Non Final Office Action mailed Jun. 11, 2010.
U.S. Appl. No. 12/183,323 Non Final Office Action mailed Jul. 19, 2010.
U.S. Appl. No. 12/392,246 Notice of Allowance mailed Jul. 15, 2010.
Z/Architecture, "Principles of Operation SA 22/7832-01 International Business Machines Corporation," 2nd Edition, Oct. 2001, pp. 1-1024.
"z/Architecture-Principles of Operation," IBM Publication No. SA22-7832-04, 5th Ed., Sep. 2005, pp. 1-1144.

* cited by examiner

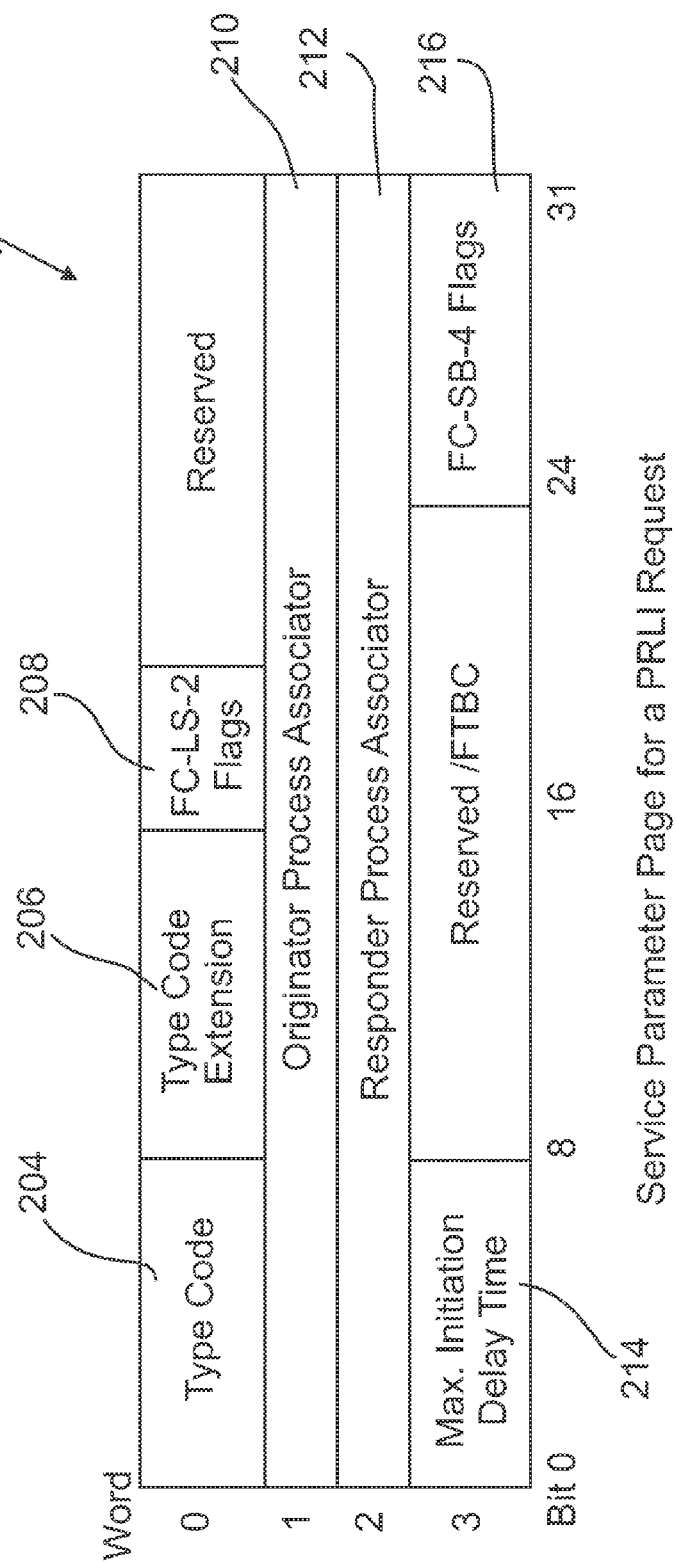

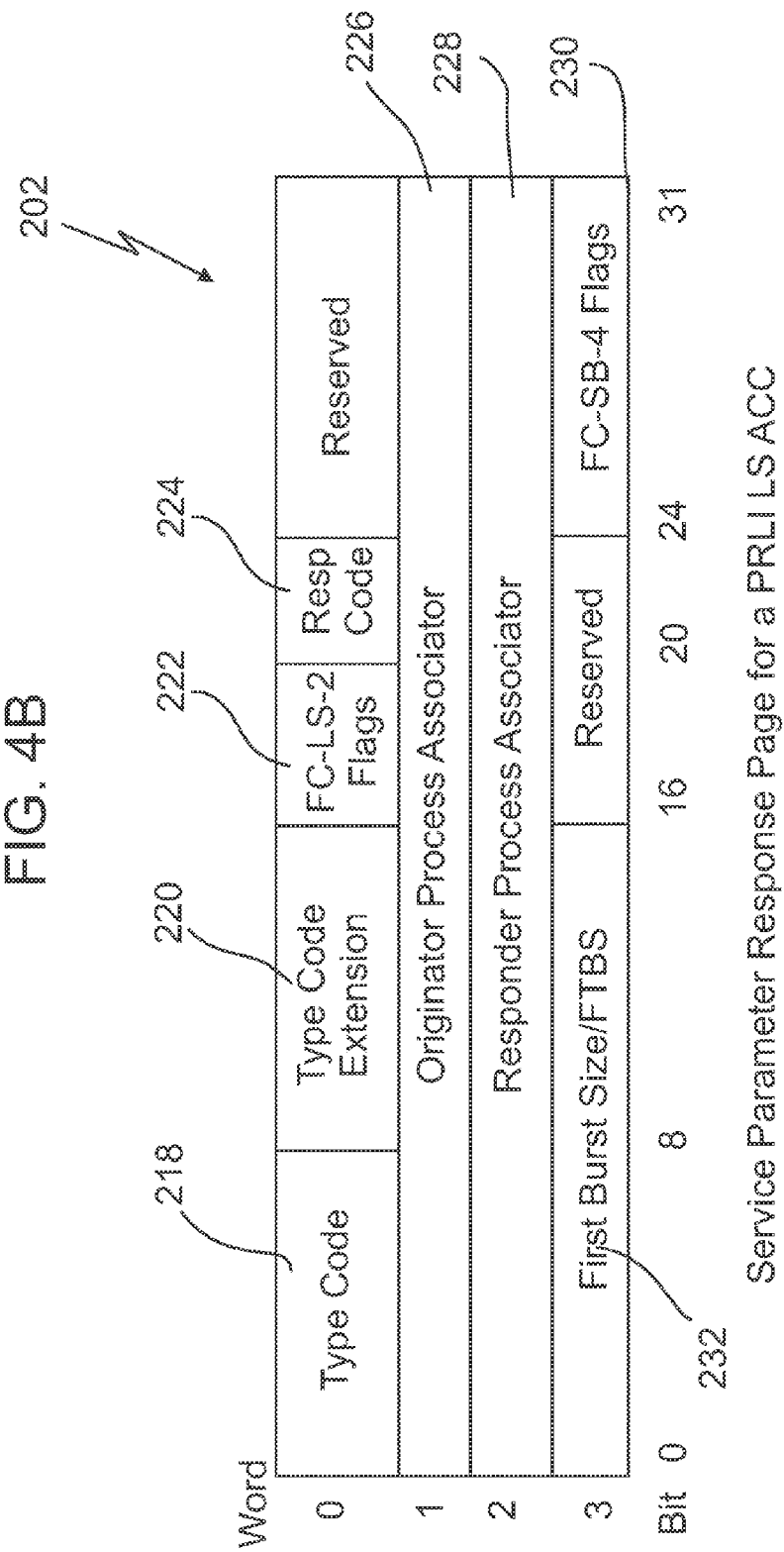

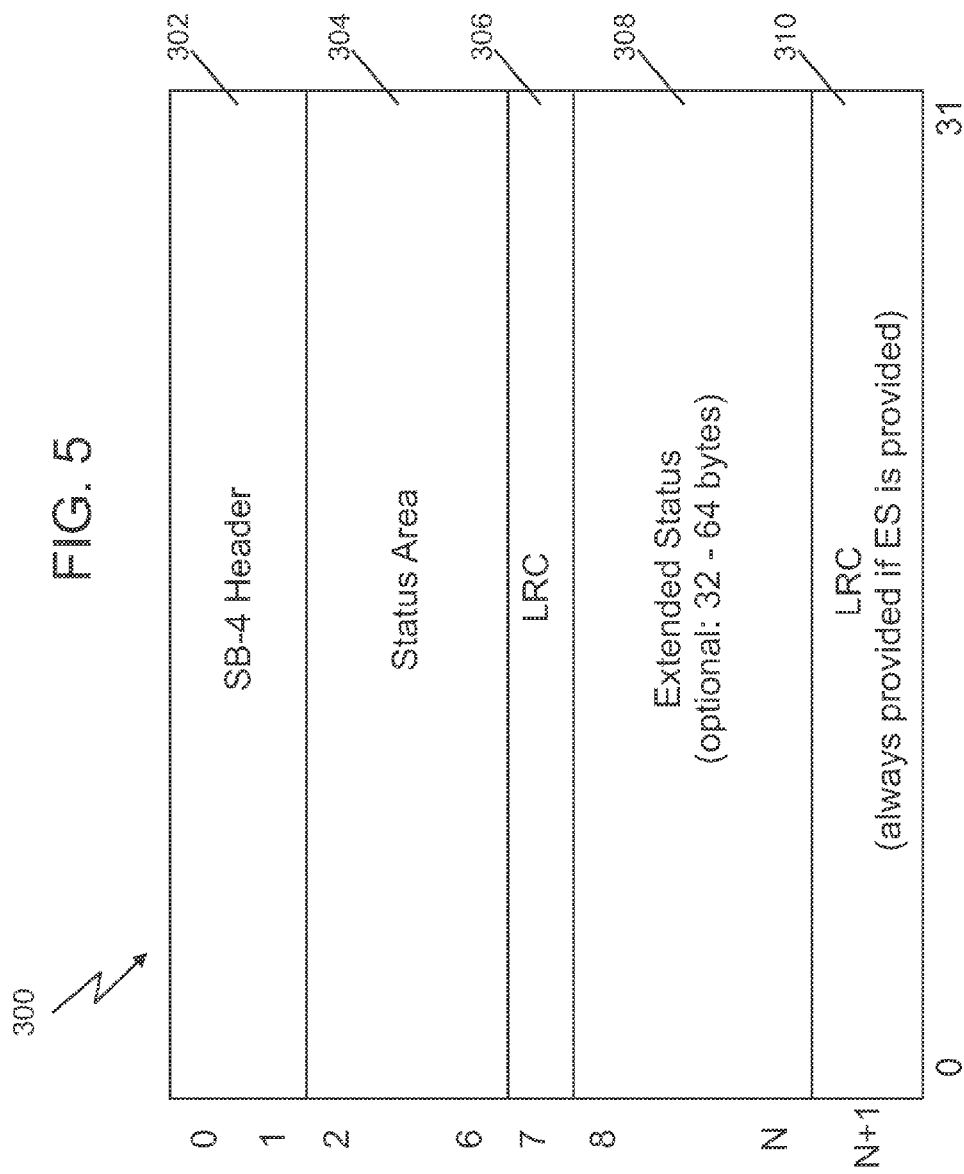

US 8,990,439 B2

TRANSPORT MODE DATA TRANSFER BETWEEN A CHANNEL SUBSYSTEM AND INPUT/OUTPUT DEVICES

BACKGROUND

The present disclosure relates generally to input/output (I/O) processing, and in particular, to providing features to facilitate transport mode I/O operations.

Input/output (I/O) operations are used to transfer data between memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

The channel subsystem and I/O device may operate in a transport mode that supports the transfer of one or more command control blocks to transfer data between the I/O devices and memory. A transport control word (TCW) specifies one or more I/O commands to be executed. For commands initiating certain I/O operations, the TCW designates memory areas associated with the operation, the action to be taken whenever a transfer to or from the area is completed, and other options.

Data transfers sent to I/O devices can cause data overflow at their respective control units if data is transferred at a rate that exceeds the ability of the control units to process the data.

SUMMARY

Embodiments include a computer program product for performing an input/output (I/O) operation initiated by an I/O operation instruction at a host computer system configured for communication with a control unit. The computer program product includes a non-transitory tangible storage medium readable by a processing circuit and storing instructions for execution by the processing circuit for performing: sending a transport mode command message from a channel subsystem in the host computer system to the control unit to initiate the I/O operation, the command message including a command for data to be transferred from the host computer system to an I/O device controlled by the control unit; and sending a data transfer message to the control unit, the data transfer message having an amount of the data to be transferred, the amount of the data to be transferred being less than or equal to a maximum amount of data, the maximum amount of data corresponding to a number of buffers associated with the control unit and a size of each of the number of buffers, the number and the size indicated by a value maintained in the host computer system.

Other embodiments include a method of performing an input/output (I/O) operation initiated by an I/O operation instruction at a host computer system configured for communication with a control unit. The method includes: sending a transport mode command message from a channel subsystem in the host computer system to the control unit to initiate the I/O operation, the command message including a command for data to be transferred from the host computer system to an I/O device controlled by the control unit; and sending a data transfer message to the control unit, the data transfer message having an amount of the data to be transferred, the amount of the data to be transferred being less than or equal to a maximum amount of data, the maximum amount of data corresponding to a number of buffers associated with the control unit and a size of each of the number of buffers, the number and the size indicated by a value maintained in the host computer system.

Further embodiments include a system for performing an input/output (I/O) operation initiated by an I/O operation instruction at a host computer system configured for communication with a control unit. The system includes a memory having computer readable computer instructions, and a processor for executing the computer readable instructions. The instructions are for: sending a transport mode command message from a channel subsystem in the host computer system to the control unit to initiate the I/O operation, the command message including a command for data to be transferred from the host computer system to an I/O device controlled by the control unit; and sending a data transfer message to the control unit, the data transfer message having an amount of the data to be transferred, the amount of the data to be transferred being less than or equal to a maximum amount of data, the maximum amount of data corresponding to a number of buffers associated with the control unit and a size of each of the number of buffers, the number and the size indicated by a value maintained in the host computer system.

BRIEF DESCRIPTION OF THE DRAWINGS

The subject matter of embodiments is particularly pointed out and distinctly claimed in the claims at the conclusion of the specification. The foregoing and other objects, features, and advantages of the invention are apparent from the following detailed description taken in conjunction with the accompanying drawings in which:

FIG. 4A and FIG. 4B (collectively referred to as FIG. 4) depicts one embodiment of a Process Login (PRLI) request message and a PRLI response message;

FIG. 5 depicts one embodiment of a transport response IU;

DETAILED DESCRIPTION

Embodiments described herein facilitate input/output (I/O) processing in a computer system. The computer system includes a host computer that includes a channel subsystem. The channel subsystem includes one or more channels for communication with a control unit of an I/O device. A data transfer control feature is provided that allows the control unit to specify a number and/or size of first-transfer buffers available to the channel. In one embodiment, the data transfer control feature defines a first-transfer-buffer size (FTBS) value specified by the control unit, and a first-transfer-buffer credits (FTBC) value. The FTBS and FTBC are stored in the channel and used to limit the amount of data that can be transferred to the control unit in a first data transfer message. In one embodiment, the control unit can specify or dynamically modify the FTBC via a response message sent to the channel in response to receiving an I/O command or commands and/or executing an I/O operation. Support for the data transfer control feature may be established during a link initialization (e.g., indicated in Process Login request and response messages) between the channel and the control unit.

Figure 1:
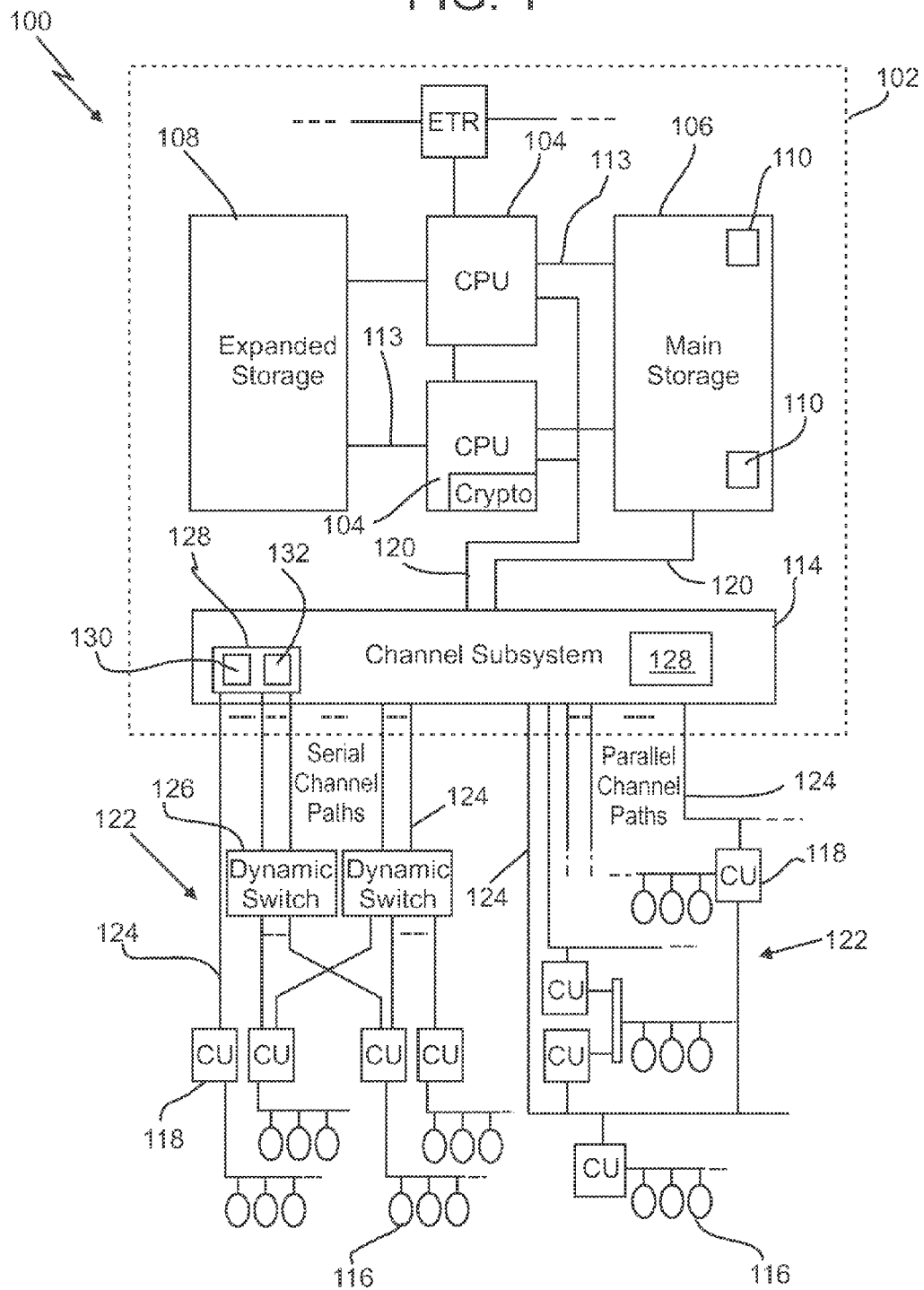
FIG. 1 depicts one embodiment of an I/O processing system incorporating and using one or more aspects of the present invention.

FIG. 1 illustrates an exemplary embodiment of an I/O processing system 100 that includes a host computer system 102 that includes a data storage and/or processing system such as a zSeries® mainframe computer by International Business Machines Corporation (IBM®). IBM is a registered trademark of International Business Machines Corporation, Armonk, N.Y., USA. Other names used herein may be registered trademarks, trademarks or product names of International Business Machines Corporation or other companies. The host computer system 102 includes various processing, storage and communication elements. In one embodiment, the host computer system 102 includes one or more central processing units (CPUs) 104, memory components such as a main storage or memory 106, an expanded storage or memory 108, one or more operating systems (OSs) 110 that are executed by one or more of the CPUs 104. For example, one CPU 104 can execute a Linux® operating system 110 and/or a z/OS® operating system 110 as different virtual machine instances. CPU 104 is the controlling center of the I/O processing system 100. It contains sequencing and processing facilities for instruction execution, interruption action, timing functions, initial program loading, and other machine-related functions. CPU 104 is coupled to the main memory 106 and/or expanded memory 108 via a connection 113, such as a bidirectional or unidirectional bus.

The host computer system 102 also includes a channel subsystem 114 that provides a communication interface between the host system 101 and various I/O devices 116, which may controlled by one or more control units 118. I/O devices include equipment such as printers, magnetic-tape units, direct-access-storage devices, displays, keyboards, communications controllers, teleprocessing devices, and sensor-based equipment. In the description herein, the terms "control unit" and "device" may be used interchangeably, or a control unit may be considered to include one or more devices. The channel subsystem 114 directs the flow of information between the I/O devices 116 and the host computer system 102. It relieves the CPUs 104 of the task of communicating directly with the I/O devices 116 and permits data processing to proceed concurrently with I/O processing. The channel subsystem 114 is coupled to the CPUs 104, the main memory 106 and/or the expanded memory 108 via a connection 120, such as a bus.

In one embodiment, the channel subsystem 114 is connected to each I/O device 116 via a respective "channel path" 122 that connects the channel subsystem 114 to each control unit 118 via a connection 124 such as a serial or parallel link. Control units 118 may be attached to the channel subsystem 114 via more than one channel path 122, and an I/O device 116 may be attached to more than one control unit 118 and/or I/O device 116. In all, an individual I/O device 116 may be accessible by multiple channel paths. A channel path can use various types of connections, such as a parallel interface, a serial-I/O interface and a FICON I/O interface. For example, a serial channel path may include one or more optical fibers connected to a control unit 118 via, e.g., a dynamic switch 126 in a Fibre channel fabric, and a parallel interface may include a number of electrical or fiberoptic conductors.

In one embodiment, the channel subsystem 114 includes one or more individual channels 128 that are each connected to one or more control units 118 and/or I/O devices 116 via one or more channel paths 122. Each channel 128 includes processing electronics such as a local channel microprocessor 130 and a local channel memory 132 that is connected to and accessible by the local channel microprocessor 130. The local channel memory 132 may include information such as a channel-program designation, a channel-path identifier, a device number, a device count, status indications, as well as information on path availability and functions pending or being performed.

Also located within each channel 128 are one or more subchannels. Each subchannel is a data structure located within a channel memory 132 that provides information concerning an associated I/O device 116 and its attachment to the channel subsystem 114. The subchannel also provides information concerning I/O operations and other functions involving the associated I/O device 116. The subchannel is the means by which the channel subsystem 114 provides information about associated I/O devices 116 to the CPUs 104. In one embodiment, the number of subchannels provided by the channel subsystem is independent of the number of channel paths 122 to the associated I/O devices 116. For example, a device 116 accessible through alternate channel paths 122 still is represented by a single subchannel.

Each control unit 118 provides logic to operate and control one or more I/O devices 116 and adapts, through the use of common facilities, the characteristics of each I/O device 116 to the link interface provided by a channel 128. The common facilities provide for the execution of I/O operations, indications concerning the status of I/O devices 116 and the control unit 118, control of the timing of data transfers over a channel path 122 and certain levels of I/O device control. A control unit 118 may be housed separately, or may be physically and logically integrated with an I/O device, the channel subsystem, or a CPU.

Each control unit 118 includes one or more buffers or memory elements (not depicted) to store messages, status information and data transferred to the control unit 118 by a channel 128. The buffers are disposed in the control unit 118, an associated I/O device, or otherwise disposed such that the control unit 118 can utilize the buffers to process I/O operations and data. One or more of the buffers are configured as "first-transfer" buffers, which are configured to receive data from the first data transfer message sent to the control unit 118 for an I/O operation or command.

One or more of the above components of the I/O processing system 100 are further described in "IBM® z/Architecture Principles of Operation", Publication No. SA22-7832-08, tenth edition, September 2012, which is hereby incorporated herein by reference in its entirety.

I/O operations are described as any operation that involves the transfer of data between the host computer system 102 and I/O devices 116. As described herein, an I/O operation includes the communications between the channel subsystem 114 and a device 116 (via, in one embodiment, a control unit 118) in which a single command (e.g., a channel command word or CCW), a single command message including multiple commands (e.g., a transport command information unit or transport command control block (TCCB)), or multiple chained commands (e.g., multiple CCWs) are sent from the channel subsystem 114 to a device. The I/O operation may also include one or more response messages generated by the device 116 or an associated control unit 118 in response to receiving and/or executing the command or chained commands.

There are two modes of subchannel operation. In one embodiment, the host computer system 102 operates in a "command mode" and specifies command word(s) in the form of a channel command word (CCW). In another embodiment, the host system operates in a "transport mode" and specifies command word(s) in the form of a transport command word (TCW).

In one embodiment, I/O operations are initiated with a device 116 by the execution of I/O instructions generated by an OS 110 that designate the subchannel associated with the device 116. Such instructions are executed in the host system by a CPU 104 by sending parameters to a channel 128 or subchannel to request that the channel subsystem 114 perform various functions in an I/O operation.

For example, the CPU 104 executes a "START SUBCHANNEL" instruction by passing parameters to the target subchannel requesting that the channel subsystem 114 perform a start function with the I/O device 116 associated with the subchannel. The channel subsystem 114 performs the start function by using information at the subchannel, including the information passed during the execution of the START SUBCHANNEL instruction, to find an accessible channel path to the device 116, and to execute the I/O operation once a channel path has been selected. In one embodiment, execution of the START SUBCHANNEL instruction passes the contents of an operation request block (ORB) to the channel subsystem 114. The ORB specifies a channel program that includes an address of one or more command words (e.g., a channel command word or a transport command word).

When an instruction such as a START SUBCHANNEL instruction is executed by the CPU 104, a channel 128 commences performing the I/O operation. In one embodiment, the channel subsystem 114 operates under a High Performance FICON (HPF) protocol for communication between the channel subsystem 114 and the devices 116 and/or control units 118. FICON and HPF are described further in "Fibre Channel: Single-Byte Command Code Sets Mapping Protocol-4 (FC-SB-4)," T11 Project 2122-D, Revision 3.00, Sep. 22, 2009, which is hereby incorporated herein by reference in its entirety.

In command mode, the channel executes a CCW channel program that include a single channel-command word or a sequence of channel-command words executed sequentially that control a specific sequence of channel operations. A control unit executes a CCW I/O operation by decoding, accepting, and executing CCW commands by an I/O device. One or more CCWs arranged for sequential execution form a CCW channel program and are executed as one or more I/O operations, respectively.

A fibre-channel-extensions (FCX) facility is an optional facility that provides for the formation of a transport mode channel program that is composed of a transport control word (TCW) that designates a transport-command-control block (TCCB) and a transport-status block (TSB). The TCCB includes a transport-command area (TCA) which contains a list of one or more (e.g., up to 30) I/O commands that are in the form of device-command words (DCWs). A TCW and its TCCB may specify operations including read and write operations.

In the transport mode, a single transport command word (TCW) specifies a location in memory of a TCCB (as well as a location in memory 106 or 108 of one or more data areas) that is sent in a single message instead of separate individual CCWs in the command mode. A control unit 118 executes a transport mode I/O operation by decoding, accepting, and executing a TCCB and the individual DCWs included therein. If the ORB specifies a TCW channel program, the channel subsystem 114 uses information in the designated TCW to transfer the TCCB to a control unit 118. The contents of the TCCB are ignored by the channel subsystem 114 after the TCCB is transferred to the control unit 118 and only have meaning to the control unit 118 and the associated I/O device 116.

Figure 2:
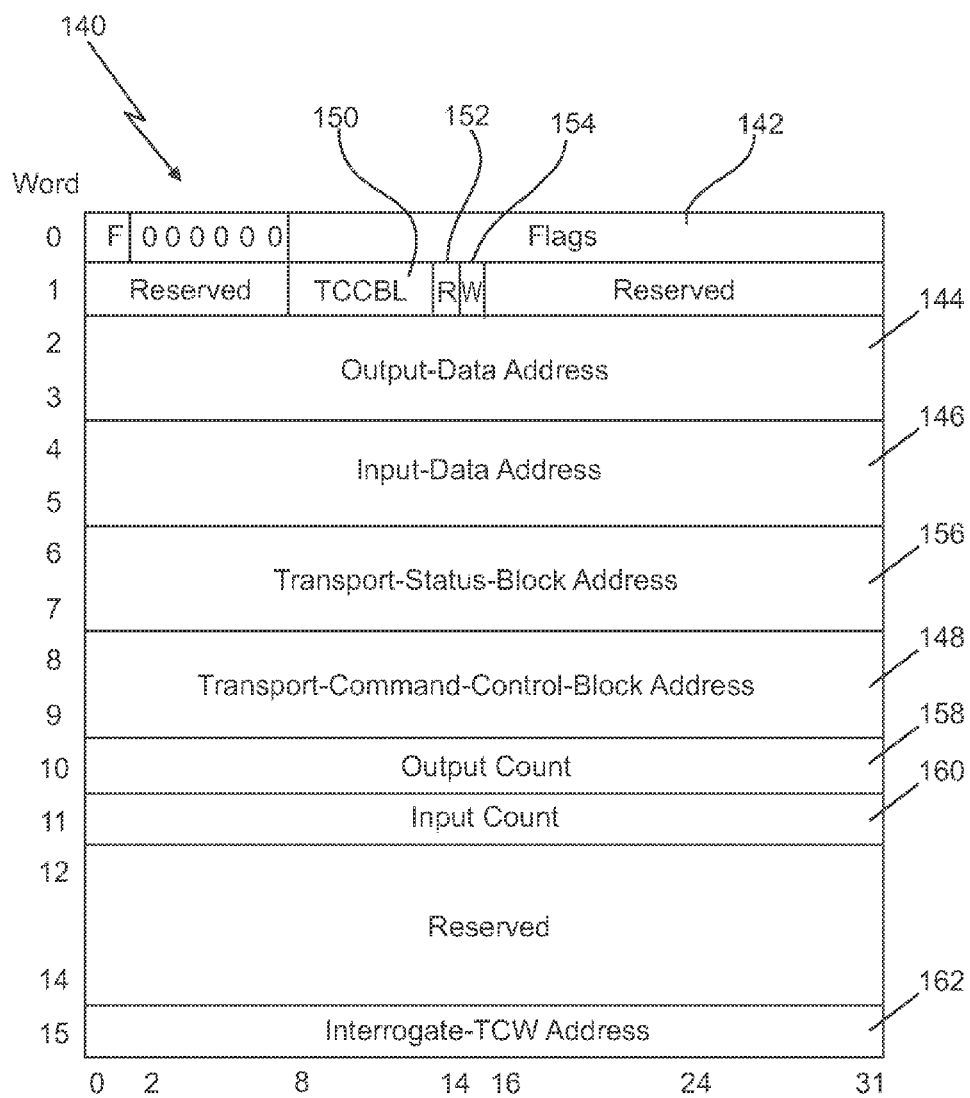
FIG. 2 depicts one embodiment of a transport control word (TCW)

FIG. 2 illustrates an embodiment of a transport-control word (TCW) 140, which is stored in the host system (e.g., main memory 106) and specifies at least one control block that is to be transferred to a control unit 118 from a channel 128. In one embodiment, the control block is a transport-command-control block (TCCB) whose contents are to be transported to the control unit 118 and I/O device 116 for processing. When the TCW 140 specifies a TCCB, the TCCB includes a TCA that specifies one or more device-command words (DCWs) and associated options. For a DCW that specifies a command which initiates the transfer of data (with the exception of control data contained within the TCCB), the TCW 140 designates one or more storage areas where the data is located.

An embodiment of the TCW 140 is a 64-byte control block that is designated on a 64-byte boundary. The TCW includes various fields described below.

For example, a number of flag fields 142 indicate whether direct or indirect data addressing is being used to locate input data, output data or the TCCB. When output data is specified, an output-data-address field 144 designates an output data location or locations. When input data is specified, an input-data-address field 146 designates an input storage location or locations (i.e., where input data is to be stored). A TCCB-address field 148 designates the address of the TCCB for the TCW. The TCW 140 also includes a TCCB Length (TCCBL) field 150 that specifies the length in bytes of the TCCB.

A Read Operations (R) field 152 is non-zero (e.g., bit 14 of word 1 is one) when indicating the number of bytes to be transferred into main memory 106. A Write Operations (W) field 154 is non-zero (e.g., bit 15 of word 1 is one) when indicating the number of bytes to be transferred from main storage. A Transport-Status-Block Address 156 specifies a location in storage of a transport-status block for the TCW. An Output Count field 158 specifies the number of output bytes for the TCW. The Input-Count field 160 specifies the number of input bytes for the TCW. If the TCW specifies an interrogation operation, an Interrogate-TCW Address field 162 indicates a location in storage of an Interrogate TCW.

Figure 3:
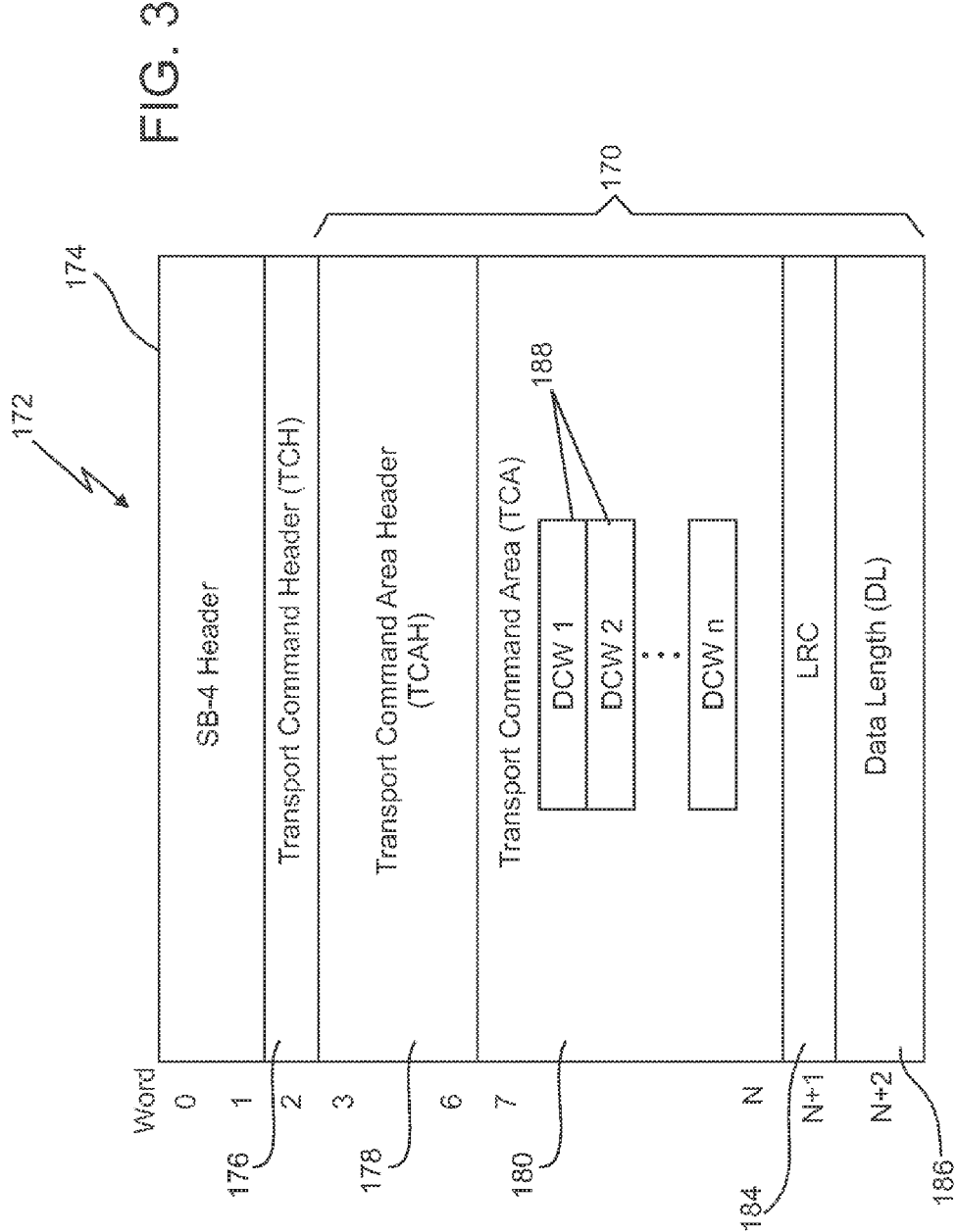
FIG. 3 depicts one embodiment of a transport command information unit (IU)

FIG. 3 shown an example of a transport-command-control block (TCCB) 170 incorporated in a transport command information unit (IU) 172 that may be sent from a channel 128 to a control unit 118 to initiate an I/O operation. The TCCB 170 includes one or more individual commands as part of a TCW I/O operation, and is sent to a control unit 118 and/or device 116 by a channel 128 via a channel path. The TCCB 170 relieves the channel of having to send multiple messages or information units, and also transfers the responsibility of executing the operation to the control unit and removes the need for the control unit 118 to send responses for each command. Instead, the control unit 118 can execute all of the commands and send a response upon completion of the operation.

In one embodiment, the transport command IU 172 is made up of an 8-byte SB-4 header 174, followed by a 4-byte transport command header (TCH) 176, and the TCCB 170. The TCCB 170 is variable in length, may contain header and trailer information, and one or more (e.g., from 1 to 30) commands as device-command words (DCWs) that are logically linked (e.g., chained) such that they are executed by the control unit 118 in a sequential manner. The TCCB 170 may reside as a single block of contiguous storage or may reside as multiple blocks of noncontiguous storage. For example, the TCCB-TIDA flag in the TCW 140 described above is used to specify whether the TCCB resides in contiguous storage.

In the embodiment of FIG. 3, the TCCB 170 includes a 16-byte transport-command-area header (TCAH) 178, a variable length transport-command area (TCA) 180, a 4-byte LRC field 184, and a 4-byte data-transfer length (DL) field 186.

The SB-4 header 174 provides FC-4 addressing information to identify the logical path and the device 116 for the data transfer. The SB-4 header 174 provides information including a channel image ID and a control unit ID for a logical path between a channel 128 and a control unit 118, as well as a device ID. The TCH 176 includes information about the TCCB 170 and the associated device operations, including the TCA and LRC lengths, and R and W fields indicating read and/or write operations. The TCA Header (TCAH) 178 includes information about the TCA 180 and the operations described therein, such as the TCA length and device indications. The TCA 180 is a variable length area that contains one or more (e.g., from 1 to 30) commands as device-command words (DCWs) 188. The length of the TCA 180, in one embodiment, is an in integral number of 4-byte words. For DCWs that specify device control data, the TCA 180 also contains the control data associated with each DCW.

Each DCW 188 specifies a command to be executed. For commands initiating certain I/O operations, it designates the count of bytes on which the operation is performed, the action to be taken whenever transfer to or from storage is completed, and other options. The storage area or areas associated with a DCW data-transfer operation are designated, depending on the operation specified by the command, by the input-data-address field 146 or the output-data-address field 144 of the TCW 140 that designates the TCCB 170 that includes the DCW 188. Whether the input-data-address field 146 or the output data-address field 144 designates the storage directly or indirectly is specified by the input-TIDA and output-TIDA flags in the TCW 140.

For example, the channel subsystem 114 initiates a TCW I/O operation with an I/O device (via, for example, a control unit 118) when a channel 128 transfers a transport-command IU 172 that includes a control block, such as a transport-command-control block (TCCB) 170 and associated control information for a TCW 140 to a selected device 116. In one embodiment, information associated with the execution of an I/O operation and the operation of a device (e.g., commands, input data and output data) is transferred between the channel 128 and the control unit 118 as Information Units (IUs). An information unit is a collection of data that is organized according to a particular structure depending on the function being performed or the data content. In one embodiment, the IUs are in the form of SB-4 Information Units (IUs). Exemplary IUs include unsolicited-command IUs, command status IUs, solicited data IUs, unsolicited data IUs, solicited control IUs, unsolicited control IUs, and data descriptor IUs.

In an exemplary embodiment, the control unit 118 generates a response message in response to executing the channel program. The control unit 118 may also generate a response message without executing the channel program under a number of communication scenarios, e.g., to inform the channel subsystem 114 that the channel program will not be executed. For example, in transport mode operations, the control unit 118 sends at least one transport-response IU that provides status for an I/O operation. The status may include normal ending status or a termination status if an abnormal condition was detected by the control unit 118.

In one embodiment, IUs or other messages are sent between the channel and the control unit via one or more exchanges. An exchange pair consisting of two unidirectional exchanges, one used by a channel 128 to send IUs and one used by a control unit 118 to send IUs, are required for all SB-4 link-control functions and for all SB-4 device-level functions that are executed in command mode. A single bi-directional exchange, referred to as a transport exchange, is used for device-level functions executed in transport mode. IUs that a channel 128 sends during the execution of an SB-4 link-control function or the execution of an SB-4 device-level function in command mode are restricted to one exchange, and IUs which a channel receives during the operation are restricted to a different exchange. The exchange on which the channel 128 sends IUs is referred to as the outbound exchange, and the exchange on which the channel 128 receives IUs is referred to as an inbound exchange. When both an outbound exchange and an inbound exchange simultaneously exist between a channel 128 and a control unit 118 for the execution of the same link-level or device-level function, an exchange pair is said to exist, and the control unit 118 is said to be connected to the channel 128. A channel program which is executed in a single connection uses only one exchange pair. If the connection is removed by the closing of the exchanges during the channel program, a new exchange pair is generated to complete the channel program. A channel 128 can initiate an exchange pair by sending an IU which opens a new exchange (or, an initiation IU) as an unsolicited command or unsolicited control information category. A control unit 118 can initiate an exchange pair by sending an initiation IU as an unsolicited control or unsolicited data information category.

For example, IUs sent between a channel and control unit during the execution of a transport mode I/O operation are restricted to a single, bi-directional exchange referred to as a transport exchange. A channel 128 opens a transport exchange by sending a transport-command IU as an unsolicited command category (an Initiation IU). A channel 128 may open multiple transport exchanges, each for a different device 116 or for the same device 116 on different logical paths.

Various commands are sent that specify the operation to be performed. Basic commands include read, write, control, sense and transport. The channel subsystem 114 distinguishes among the following operations: control, output forward (write), input forward (read, sense, sense ID), input backward (read backward), branching (transfer in channel) and transport. Some commands, when executed, do not result in the transfer of data but cause the device to chain and start execution of the next command when all of the conditions for command chaining are satisfied. Each of the basic operations is described below.

A read command initiates execution of a device operation that performs device-to-channel data transfer. A write command initiates execution of a device operation that performs channel-to-device data transfer. A control command initiates execution of a device operation that makes use of control data provided the associated command message. The sense command is similar to a read command, except that the data is obtained from sense indicators rather than from a record source. Control commands and associated control data are provided for management of the specific I/O device and control of the device during execution of an I/O command. A transport command is provided to manage the I/O operation and the transfer of data via a channel path.

During a write operation, data is transferred to the control unit in one or more transport-data IUs on the exchange associated with the I/O operation. The data to be transferred, specified by a write command (e.g., in a DCW), may be transferred in a single transport-data IU, or in multiple transport-data IUs. In one embodiment, for data transferred subsequent to the first transport-data IU, each transport-data IU is sent to the control unit in response to a transfer-ready IU received from the control unit. After receiving a transfer-ready IU, the channel sends a single transport-data IU with the amount of data specified in the preceding transfer-ready IU. The control unit may request additional data by sending additional transfer ready IUs until it has requested all the data specified by a write command or a write operation.

For the first data transfer of the write command/operation, a "first-transfer-ready" setting (established, e.g., during login) controls whether the first transport-data IU of a write operation can be sent with or without receiving a transfer-ready IU from the control unit.

For example, if the I/O operation includes a write operation and "first-transfer ready" is disabled, the channel 128 sends a transport-data IU including data to be written to the I/O device immediately following the transport-command IU. The exchange is left open and sequence initiative for the exchange is transferred to the control unit. After the first transport-data IU, the channel 128 requires a transfer-ready IU from the control unit 118 prior to sending each subsequent transport-data IU 310. The control unit 118 may request additional data by sending additional transfer-ready IUs until it has requested all the data specified by the TCCB 170 for the write operation.

If "first-transfer ready" is enabled (i.e., first-transfer-ready-disabled is inhibited), after the channel 128 sends the transport-command IU, the exchange is left open and sequence initiative for the exchange is transferred to the control unit 118. The channel 128 can send the first and subsequent transport-data IUs only after receiving a transfer-ready IU from the control unit 118.

The channel 128 may indicate that first-transfer ready is disabled by not transferring sequence initiative to the control unit 118 (i.e., setting the SI bit to 1) in the transport-command IU. Sequence initiative is instead transferred (SI bit=1) in the first burst transport-data IU instead.

Likewise, the channel may indicate that first-transfer-ready-disabled is inhibited (or first-transfer ready is enabled) by transferring sequence initiative in the transport-command IU (SI bit=1) which indicates a transfer-ready IU is required for the first burst. Whether first-transfer ready is disabled may be established during, e.g., Process Login (PRLI) initialization.

In one embodiment, the system 100 includes a data transfer control feature that allows a control unit 118 to manage the amount of data that is sent in a single data transfer message from a channel 128. As described herein, a "message" refers to a data structure that is sent between the channel and control unit (e.g., a transport-command IU or a transport-data IU), which may be defined by a pre-determined protocol. An example of a message or data structure is an information unit, which may include one or more fibre channel frames.

In one embodiment, the channel 128 includes (e.g., in the local channel memory 132) information regarding the size of available buffers associated with the control unit 118 to which the channel 128 is connected. The channel may also include information regarding the available buffer credits for the control unit 118. For example, prior to initiating the I/O operation, e.g., during a login or initialization process, the control unit 118 sends buffer size and/or buffer credit information to the channel. An exemplary initialization process is a process login (PRLI) process.

The data transfer control feature establishes a "first-transfer-buffer size" control and "first-transfer-buffer credits" control that allows a control unit to manage the amount of data that can be sent in first transport-data IUs by the channel when first-transfer-ready-disabled is in effect for transport mode I/O operations between the channel and control unit. The combination of the first-transfer-buffer size and first-transfer-buffer credits limits the amount of data that can be sent by a channel to a control unit in first write data-transfer IUs for all logical paths established between the channel and control unit when first-transfer-ready-disable is in effect.

In one embodiment, when both the channel and the control unit indicate support for the data transfer control feature (e.g., support is indicated during process login), the channel maintains a first-transfer-buffer credit (FTBC) value and a first-transfer-buffer size (FTBS) value to manage the amount of data that can be sent to the control unit, e.g., in a first transport-data IU when first transfer ready-disabled is in effect for a transport-mode operation. The FTBC indicates the current number of first-transfer buffers that are available at the control unit and the FTBS indicates the size of each first-transfer buffer. The FTBC and the FTBS establish a maximum amount of data that the channel can send to the control unit in a first data transfer message, e.g., a first transport-data IU. The FTBC and FTBS apply to all transport-mode operations between a channel and control unit for all established logical paths between the channel and control unit.

The channel may maintain the FTBC and the FTBS during at least the period during which a link is valid between the channel and the control unit. In the event that the control unit sends a message indicating a change in the number of available first-transfer buffers, the channel can update the FTBC to reflect the change. In one embodiment, the channel stores the FTBC and the FTBS in the local channel memory 132.

Support for the data transfer control feature, as well as data transfer controls, may be established during initialization procedures, such as link initialization in which the channel subsystem and the control unit use login messages to provide indications to one another regarding their respective support for the data transfer control feature.

For example, link initialization between the channel subsystem and control units is performed using the process login (PRLI) extended link service (ELS) protocol. General aspects of the PRLI ELS, including the format of the PRLI ELS request and response, are given in "Fibre Channel: Link Services (FC-LS-2)," T11 Project 2103-D, Revision 2.00, Jun. 26, 2008, which is hereby incorporated herein by reference in its entirety.

During a PRLI procedure, a channel 128 that supports PRLI sends a request to each control unit 118 that also supports the process login ELS to determine whether the control unit 118 supports transport-mode operations. In one embodiment, the PRLI request is sent during channel initialization prior to establishing logical paths. The PRLI ELS is used to exchange process login service parameters between a channel 128 and control unit 118. A PRLI ELS request may be sent by a channel to a control unit when logical paths are established with the control unit and applies to all the established logical paths. Parameters may be exchanged between a channel and control unit via a PRLI request and a PRLI response. A bit in the PRLI request (e.g., a flag bit) may be set to indicate support for the data transfer control feature. For example, a first-transfer-buffer credits (FTBC) bit is set to one in the PRLI request sent to the control unit when the channel supports the control feature. The control unit can similarly indicate whether the data transfer control feature is supported in a PRLI response.

FIG. 4 illustrates exemplary PRLI messages that can be exchanged between a channel and a control unit to establish logical paths therebetween and various communication parameters, as well as to establish support and parameters for the data transfer control feature. A service parameter page 200 of a PRLI request, sent by the channel in a FC frame, is shown and referred to herein as a "PRLI request" 200. A service parameter page 202 of a PRLI response, sent by the control unit in a FC frame, is shown and referred to herein as a "PRLI accept" 202.

The PRLI request 200 includes various fields such as a type code 204 that identifies the communication protocol (e.g., FC-4), a type code extension 206, FC-LS-2 flags 208, an originator process associator 210, a responder process associator 212, and a maximum initiation delay time 214. A FC-SB-4 flags field 216 includes bits that may be set to indicate whether transport mode is supported and whether first-transfer-ready-disabled operation is supported by the channel.

The PRLI accept 202 includes various fields such as a type code 218 that identifies the communication protocol (e.g., FC-4), a type code extension 220, FC-LS-2 flags 222, a response code 224 an originator process associator 226 and a responder process Associator 228. A FC-SB-4 flags field 230 includes bits that may be set to indicate whether transport mode is supported and whether first-transfer-ready-disabled operation is supported by the control unit.

The PRLI Request 200 and the PRLI Accept 202 may be used to indicate whether the data transfer control feature is supported. For example, a bit or other indication is added to the PRLI Request 200 and the PRLI Accept 202 to indicate that the channel and the control unit support the feature.

In one embodiment, when support is indicated by the channel, the Process Login ELS is configured such that the PRLI Request 200 includes a FTBC value in Word 3. When support is indicated by the control unit, the Process Login ELS includes a FTBS value in the PRLI Accept 202. A default value is specified in the channel for the maximum-first-transfer-buffer credits (MFTBC) and a mechanism is defined for dynamically modifying this value via a response message from the control unit, e.g., a transport-response IU.

For example, when the use of first-transfer-buffer credits is not supported by the control unit or the channel, a field 232, e.g., bytes 0-1 of word 3 of the PRLI Accept 202, specifies the first-burst size. When non-zero, the first burst size is an unsigned 16-bit binary integer that specifies the maximum amount of data in units of 4 k bytes that are allowed to be sent in the first transport-data IU for a write data transfer when first-transfer-ready disabled is in effect for a transport-mode operation. A value of zero indicates that there is no first-burst size limit specified by the control unit.

When the use of first-transfer-buffer credits is supported by both the channel and the control unit, the field 232 specifies the first-transfer-buffer size via the FTBS value. The FTBS value is an unsigned 16-bit binary integer that specifies in units of 4 k bytes the size of each first-transfer buffer. A first-transfer-buffer-size equal to zero indicates that there is no buffer space allocated by the control unit for a first write transport-data IU when first-data-transfer-ready disabled is in effect.

Following completion of a process login or other initialization in which first-transfer-buffer-credit support is indicated by both the channel and control unit, the channel sets the FTBC to a default maximum FTBC (MFTBC) of, e.g., 16 buffer credits, and sets the FTBS equal to the first-transfer-buffer size specified by the control unit in the PRLI Accept 202.

When the channel sends a first transport-data IU to the control unit when first-transfer-ready disabled is in effect, it decrements the FTBC by the number of credits (corresponding to the number of first-transfer buffers) required to contain all of the data sent in the first transport-data IU. The channel will not send an amount of data in a first transport-data IU that exceeds the amount of buffer space available at control unit for the channel as indicated by the FTBC value maintained at the channel.

When a transport-response IU is received for the operation or the operation is otherwise terminated, the channel increments the FTBC maintained at the channel by the number of credits that were subtracted from the FTBC to perform the operation. If the resultant FTBC exceeds the maximum FTBC, the FTBC is set to the maximum FTBC. When the FTBC at the channel is zero or indicates that the first-transfer buffer space available at the control is not large enough to contain all of the write data of an operation when first-transfer-ready disabled is in effect, the channel may choose to inhibit first-transfer-ready disabled for the operation.

Figure 6:
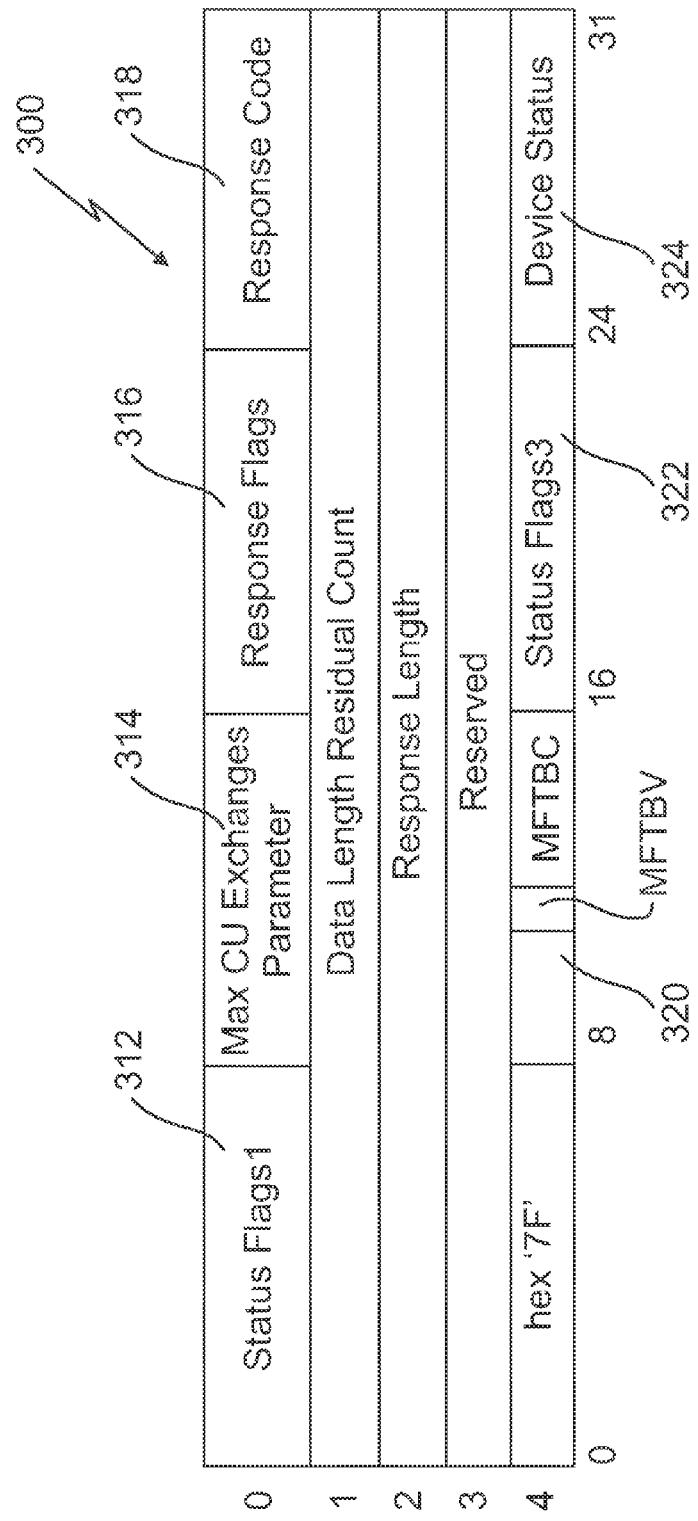
FIG. 6 depicts one embodiment of a status area of the transport response IU of FIG. 5.

FIGS. 5 and 6 illustrate an exemplary transport response IU 300 that may be sent by a control unit 118. The Transport Response IU 300 provides status for a TCW I/O operation, which may include a normal ending status or, when an abnormal condition has been detected, termination status that indicates the cause for abnormal termination of the operation. The transport response IU 300 may also include an extended status field that provides further status for the operation. A transport-response IU may or may not close a transport exchange. If the transport exchange has not been closed by the transport-response IU, the channel may send a transport-confirm IU that closes the exchange after receiving the transport-response IU.

In the example shown in FIG. 5, the transport-response IU 300 includes a SB-4 header 302 followed by a status field 304, a status LRC 306, and an optional extended-status field 308 containing from, e.g., 32 to 64 bytes. When extended status is provided, a 4-byte extended-status LRC field 310 may be provided as the last word of the transport-response IU 330. The SB-4 header 302 has a format similar to that of the transport command IU and is set equal to the SB-4 header in the transport command IU for this exchange.

FIG. 6 shows an embodiment of the status area of the transport-response IU 300. The status area 304 in this embodiment is 20 bytes and contains information about the TCW I/O operation. A "status flags 1" field 312 includes one or more exception codes that are set by the control unit 118 to report an abnormal condition detected during a TCW I/O operation. The status area 304 also includes a maximum exchange field 314, response flags 316 and a response code field 318.

A Status Flags2 field 320 and a Status Flags3 field 322 provide additional information about the I/O operation, and the I/O device's status is indicated by a Device Status field 324.

The transport-response IU may be used by the control unit to set or modify the parameters by which the channel can send data to the control unit. For example, the control unit sends a transport-response IU 300 that includes an indication of the number of first-transfer buffers that are available to the channel.

In one embodiment, the control unit specifies the number of available first-transfer buffers via a maximum FTBC value in the transport-response IU. This value, if different than the maximum FTBC value maintained at the channel, is used by the channel the rest the maintained maximum FTBC.

For example, the maximum FTBC maintained by a channel may be modified by the control unit when it sends a transport-response IU to the channel via a maximum first transfer buffer credit (MFTBC) value that specifies the maximum number of buffers available for a first transport-data IU for subsequent I/O operations or commands from this channel that are executed by the control unit.

Referring again to FIG. 6, in one embodiment, the transport-response IU includes a maximum first transfer buffer credit valid (MFTBV) bit or other indication that indicates that a valid MFTBC is specified by the transport-response IU 300. For example, the status flags 2 field 320 includes a MFTBV bit, e.g., bit 3 of the field 320. When the use of first-transfer-buffer credits is supported, the MFTBV bit is set to one to indicate that a MFTBC field in the status-flags2 field 320 contains a valid MFTBC. When the MFTBV bit is set to zero, the MFTBC field does not contain a valid MFTBC. When the use of first-transfer-buffer credits is not supported, bit 3 is set to zero by the control unit and is ignored by the channel.

The MFTBC field, e.g., bits 4-7, is valid when the MFTBV bit is one. When the MFTBC field is valid, it contains a value that indicates the maximum number of first-transfer buffers, i.e., first-transfer buffer credits, supported by the control unit for use by the channel. For example, when non-zero, the MFTBC value is a 4-bit unsigned binary integer that is treated as a binary exponent to indicate the maximum number of first transfer buffers supported by the control unit for use by the channel. For example, an MFTBC equal to one shall indicate 2*1 first-transfer buffers or two first-transfer buffers; an MFTBC equal to 15 shall indicate 2*15 first transfer buffers or about 32,000 first-transfer buffers. When the MFTBC is zero, it indicates that zero first-transfer buffer credits are supported by the control unit for use by the channel. When the MFTBV bit is zero, the MFTBC bits are set to zero by the control unit and are ignored by the channel.

As indicated above, the control unit can change the maximum FTBC value by setting the MFTBV flag to one and by providing a different value for the maximum FTBC in the MFTBC field. The MFTBC provided by the control unit replaces the maximum FTBC maintained at the channel and, if the FTBC is greater than the new maximum FTBC, the FTBC is set equal to the new maximum FTBC.

Figure 7:
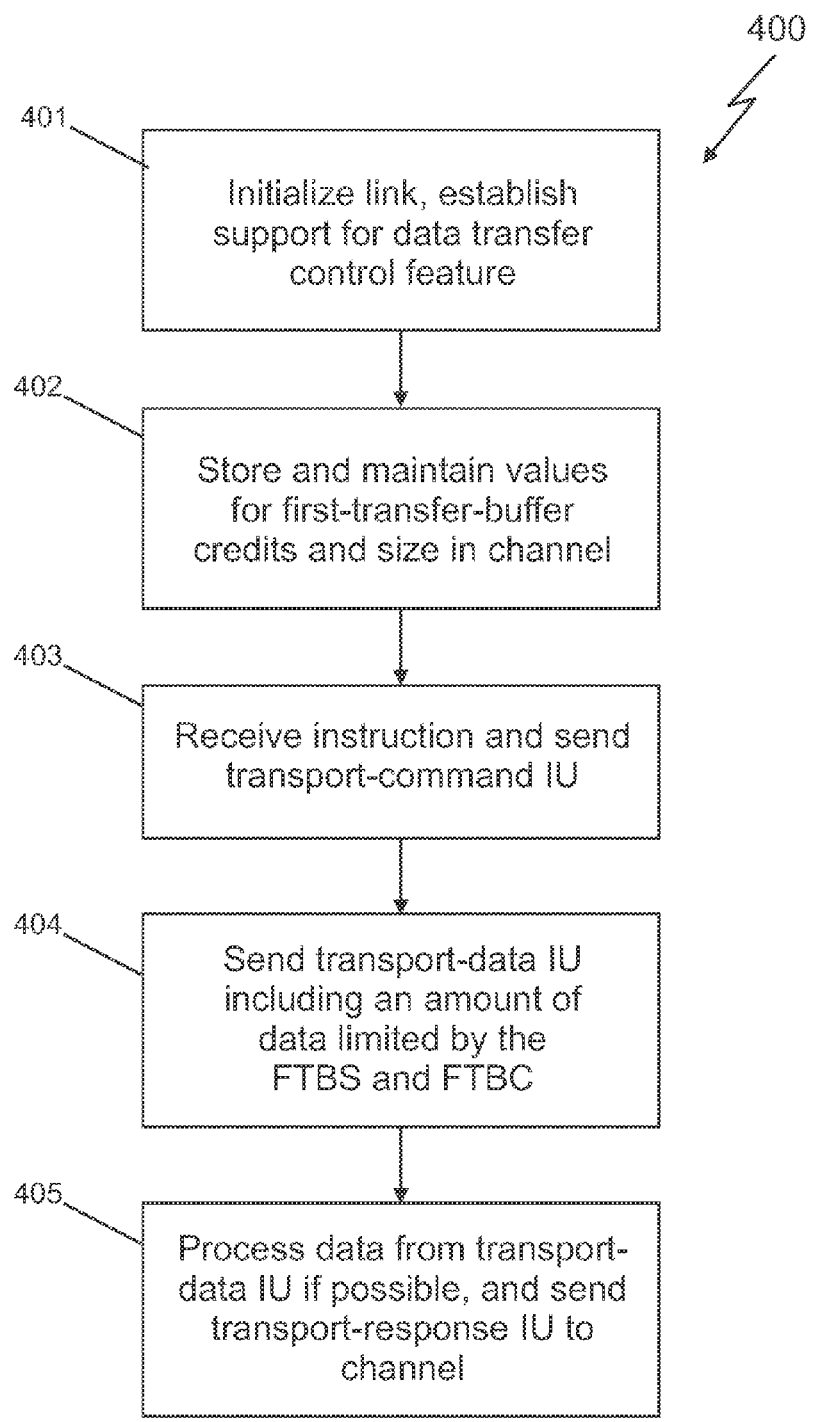
FIG. 7 is a flow chart depicting an embodiment of a method for configuring communications between a channel and a control unit of an I/O device and/or performing an I/O operation.

Referring to FIG. 7, an embodiment of a method of configuring communications between a channel and a control unit and/or performing a transport mode I/O operation 400 is shown. The method includes one or more stages 401-405. In one embodiment, the method includes the execution of all of the stages 401-405 in the order described. However, certain stages may be omitted, stages may be added, or the order of the stages changed.

In stage 401, a link or communication is established between a channel 128 in a channel subsystem 114 and a control unit 118. In one embodiment, a PRLI or other initialization procedure is performed to initialize logical paths between the channel 128 and the control unit 118. For example, the channel 128 sends a PRLI Request message that indicates various link parameters, and the control unit 118 sends a PRLI Accept message indicating link parameters. In one embodiment, the PRLI messages (or other type of initialization messages) indicate whether the channel 128 and the control unit 118 support first-transfer ready disabling. The messages may also be used to indicate whether the channel 128 and control unit 118 support the data transfer control feature including, e.g., first-transfer-buffer credits (FTBC) and first-transfer-buffer size (FTBS).

During the initialization procedure, the control unit 118 sends information regarding the number and/or size of control unit buffers to the channel 128. The information provides the number and/or size of buffers associated with the control unit 118 that are capable of receiving data transferred in a first data transfer message. For example, the control unit 118 sends a PRLI Accept message that includes a value that specifies the size of each buffer, e.g., a FTBS value.

In stage 402, the channel 128 stores a value for the FTBS according to the value received from the control unit 118. The channel 128 also stores a value for the FTBC. The FTBS and FTBC may be stored and maintained in any suitable data structure in, e.g., the local channel memory 132. In one embodiment, the channel 128 sets the FTBC to a default maximum FTBC or a maximum FTBC that was otherwise pre-set. For example, the channel 128 sets the FTBC to a default maximum of 16 buffer credits. The channel thus stores three values: the FTBS value received by the control unit, a FTBC value (i.e., the current FTBC value) and a maximum FTBC value.

In stage 403, the channel subsystem 114 receives an instruction and initiates an I/O operation with one or more control units 118. For example, the channel 128 of the channel subsystem 114 sends a command message such as a transport-command IU for an I/O operation that includes a write transfer to a device associated with the control unit 118.

The control unit 118 receives the command message from the channel subsystem 114. For example, the control unit 118 receives the transport-command IU from the channel 128.

In one embodiment, the transport-command IU indicates that first-transfer-ready is disabled, which allows the channel 128 to send the first transport-data IU without requiring a transfer-ready IU from the control unit 118. This may be indicated by setting the Sequence Initiative (SI) bit in the FC frame header of the transport-command IU to zero so that the channel 128 retains Sequence Initiative for transferring frames.

In stage 404, if first-transfer-ready is disabled, the channel 128 sends data to be transferred (as specified by a write command in the transport-command IU) in at least one data transfer message. In one embodiment, the data transfer message is a transport-data IU. The amount of data sent in the first transport-data IU is less than the maximum amount of data specified by the FTBC and the FTBS (e.g., the buffer size multiplied by the current number of buffer credits).

In stage 405, the control unit 118 processes the write data in the transport-data IU or terminates the operation if an abnormal condition exists. Subsequent transport-data IUs may be sent to the control unit 118 if additional data remains to be written.

The control unit 118 may send a response message to the channel 128 indicating that the command was executed or otherwise indicating a status of the I/O operation. The response message may be used to modify the amount of data that can be sent in first transport-data IUs or other data transfer messages for subsequent write commands or operations. The control unit 118 can thus dynamically modify the amount of first-transfer data in response to changes in available first-transfer buffer space.

If the control unit 118 wants to change the amount of data that can be sent, the control unit 118 can include a maximum first transfer buffer credit (MFTBC) that includes a different value than the default maximum FTBC maintained by the channel, as described above.

If desired, the control unit 118 can disable first-transfer-ready by including an indication in the transport-response IU that causes first-transfer-ready-disabled to be inhibited, so that when the channel 128 re-sends the transport-command IU, it will wait for a transfer-ready IU from the control unit 118 before transferring data.

Technical effects and benefits of exemplary embodiments include the ability to allow control units to control data transfer by establishing limits on data transfers to the control unit. For example, the embodiments described herein allow the control unit to control the amount of data sent in a first data transfer.

In some instances, such as transfers over extended fibre channel link distances (e.g., up to 100 km), transport mode write data transfers performed when first-transfer-ready disabled is in effect can cause data overflow at the control unit due. For example, the amount of data transfers in a first transport-data IU may exceed the control unit's available buffer space or otherwise overwhelm the control unit's ability to process the data. The embodiments described herein allow the control unit to prevent such conditions or address such conditions during an I/O operation (e.g., modify data transfer size settings).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The invention claimed is:

1. A computer program product for performing an input/output (I/O) operation initiated by an I/O operation instruction at a host computer system configured for communication with a control unit, the computer program product comprising:
a non-transitory tangible storage medium readable by a processing circuit and storing instructions for execution by the processing circuit for performing a method comprising:
sending a transport mode command message from a channel subsystem in the host computer system to the control unit to initiate the I/O operation, the command message including a command for data to be transferred from the host computer system to an I/O device controlled by the control unit; and
sending a data transfer message to the control unit, the data transfer message having an amount of the data to be transferred, the amount of the data to be transferred to be less than or equal to a maximum amount of data, the maximum amount of data corresponding to a number of buffers associated with the control unit and a size of each of the number of buffers, the number of buffers indicated by a buffer credit value maintained in the host computer system, and the size indicated by a buffer size value maintained in the host computer system, the buffer size value received from the control unit during initialization of a link between the control unit and the channel subsystem.

2. The computer program product of claim 1, wherein the method further comprises:
receiving a response message from the control unit in response to at least one of receiving the transport mode command message and executing the I/O operation, the response message specifying a maximum number of buffers available to receive data from the channel subsystem; and
in response to the maximum number being different than the number maintained in the host computer system, modifying the number maintained in the host computer system to correspond to the maximum number.

3. The computer program product of claim 2, wherein the method further comprises sending a subsequent data transfer message for a subsequent command, the subsequent data transfer message having an amount of data that is less than or equal to an amount corresponding to the maximum number.

4. The computer program product of claim 1, wherein the data transfer message is a first data transfer message sent to the control unit for the command, and the number of buffers is a number of first-transfer buffers configured to receive the first data transfer message.

5. The computer program product of claim 1, wherein the command message is a transport-command information unit (IU) and the data transfer message is a transport-data IU.

6. The computer program product of claim 5, wherein the transport-data IU is a first transport data IU sent to the control unit for the command, the first transport-data IU is sent according to a "first-transfer-ready" setting that controls whether the first transport-data IU can be sent with or without receiving a transfer-ready IU from the control unit, wherein:
based on first-transfer-ready being enabled, the channel subsystem is configured to transfer data to the control unit only after receiving a transfer-ready IU from the control unit; and
based on first-transfer-ready being disabled, the channel subsystem is configured to transfer data to the control unit without receiving a transfer-ready IU.

7. The computer program product of claim 6, wherein the first-transfer-ready setting is disabled, and the first transport-data IU is sent without receiving a transfer-ready IU from the control unit.

8. The computer program product of claim 6, wherein the channel subsystem is configured to maintain a first-transfer-buffer credit (FTBC) value indicating the number of first-transfer buffers available at the control unit to receive data from the first transport-data IU when first-transfer-ready is disabled, and a first-transfer-buffer size (FTBS) value indicating the size of each available first-transfer buffer.

9. The computer program product of claim 8, wherein the method further comprises:
receiving a transport-response IU from the control unit in response to at least one of receiving the transport mode command message and executing the I/O operation, the transport-response IU including a maximum first transfer buffer credit (MFTBC) value indicating a maximum number of buffers available to receive data from the first-transport-data IU; and
in response to the MFTBC value being different than the FTBC value, modifying the FTBC value maintained in the host computer system to correspond to the MFTBC value.

10. The computer program product of claim 1, wherein the host computer system is configured to maintain a maximum buffer credit value indicating the maximum number of buffer credits that can be supported by the control unit.

11. The computer program product of claim 10, wherein the host computer system is configured to set a default value for the maximum buffer credit value during initialization of the link, and modify the maximum buffer credit value based on receiving a modified maximum buffer credit value from the control unit.

12. The computer program product of claim 1, wherein the command message includes a transport command control block (TCCB) configured to hold a plurality of commands, and the plurality of commands are a plurality of device command words (DCW) that each is associated with an I/O command, and the TCCB is specified by a transport command word (TCW) at the channel subsystem in the host computer system for the I/O operation.

13. A method of performing an input/output (I/O) operation initiated by an I/O operation instruction at a host computer system configured for communication with a control unit, the method comprising:
  sending a transport mode command message from a channel subsystem in the host computer system to the control unit to initiate the I/O operation, the command message including a command for data to be transferred from the host computer system to an I/O device controlled by the control unit; and
  sending a data transfer message to the control unit, the data transfer message having an amount of the data to be transferred, the amount of the data to be transferred being less than or equal to a maximum amount of data, the maximum amount of data corresponding to a number of buffers associated with the control unit and a size of each of the number of buffers, the number of buffers indicated by a buffer credit value maintained in the host computer system, and the size indicated by a buffer size value maintained in the host computer system, the buffer size value received from the control unit during initialization of a link between the control unit and the channel subsystem.

14. The method of claim 13, further comprising:
  receiving a response message from the control unit in response to at least one of receiving the transport mode command message and executing the I/O operation, the response message specifying a maximum number of buffers available to receive data from the channel subsystem; and
  in response to the maximum number being different than the number maintained in the host computer system, modifying the number maintained in the host computer system to correspond to the maximum number.

15. The method of claim 13, wherein the command message is a transport-command information unit (IU) and the data transfer message is a first transport data IU sent to the control unit for the command, the first transport-data IU is sent according to a "first-transfer-ready" setting that controls whether the first transport-data IU can be sent with or without receiving a transfer-ready IU from the control unit, wherein:
  based on first-transfer-ready being enabled, the channel subsystem is configured to transfer data to the control unit only after receiving a transfer-ready IU from the control unit; and
  based on first-transfer-ready being disabled, the channel subsystem is configured to transfer data to the control unit without receiving a transfer-ready IU.

16. The method of claim 15, wherein the channel subsystem is configured to maintain a first-transfer-buffer credit (FTBC) value indicating the number of first-transfer buffers available at the control unit to receive data from the first transport-data IU when first-transfer-ready is disabled, and a first-transfer-buffer size (FTBS) value indicating the size of each available first-transfer buffer.

17. The method of claim 16, further comprising:
  receiving a transport-response IU from the control unit in response to at least one of receiving the transport mode command message and executing the I/O operation, the transport-response IU including a maximum first transfer buffer credit (MFTBC) value indicating a maximum number of buffers available to receive data from the first-transport-data IU; and
  in response to the MFTBC value being different than the FTBC value, modifying the FTBC value maintained in the host computer system to correspond to the MFTBC value.

18. A system for performing an input/output (I/O) operation initiated by an I/O operation instruction at a host computer system configured for communication with a control unit, comprising:
  a memory having computer readable computer instructions; and
  a processor for executing the computer readable instructions, the instructions for:
  sending a transport mode command message from a channel subsystem in the host computer system to the control unit to initiate the I/O operation, the command message including a command for data to be transferred from the host computer system to an I/O device controlled by the control unit; and
  sending a data transfer message to the control unit, the data transfer message having an amount of the data to be transferred, the amount of the data to be transferred being less than or equal to a maximum amount of data, the maximum amount of data corresponding to a number of buffers associated with the control unit and a size of each of the number of buffers, the number of buffers indicated by a buffer credit value maintained in the host computer system, and the size indicated by a buffer size value maintained in the host computer system, the buffer size value received from the control unit during initialization of a link between the control unit and the channel subsystem.

19. The system of claim 18, wherein the command message is a transport-command information unit (IU) and the data transfer message is a first transport data IU sent to the control unit for the command, the first transport-data IU is sent according to a "first-transfer-ready" setting that controls whether the first transport-data IU can be sent with or without receiving a transfer-ready IU from the control unit, wherein:
  based on first-transfer-ready being enabled, the channel subsystem is configured to transfer data to the control unit only after receiving a transfer-ready IU from the control unit; and
  based on first-transfer-ready being disabled, the channel subsystem is configured to transfer data to the control unit without receiving a transfer-ready IU.

20. The system of claim 19, wherein the channel subsystem is configured to maintain a first-transfer-buffer credit (FTBC) value indicating the number of first-transfer buffers available at the control unit to receive data from the first transport-data IU when first-transfer-ready is disabled, and a first-transfer-buffer size (FTBS) value indicating the size of each available first-transfer buffer.

* * * * *